(12) United States Patent
Suito

(10) Patent No.: US 7,542,097 B2
(45) Date of Patent: Jun. 2, 2009

(54) VIDEO SIGNAL PROCESSING APPARATUS AND METHOD

(75) Inventor: Taro Suito, Kanagawa (JP)

(73) Assignee: Sony Corporation (JP)

( * ) Notice: Subject to any disclaimer, the term of this patent is extended or adjusted under 35 U.S.C. 154(b) by 609 days.

(21) Appl. No.: 10/515,148

(22) PCT Filed: May 19, 2003

(86) PCT No.: PCT/JP03/06182

§ 371 (c)(1),
(2), (4) Date: Jun. 13, 2005

(87) PCT Pub. No.: WO03/098929

PCT Pub. Date: Nov. 27, 2003

(65) Prior Publication Data

US 2005/0231641 A1 Oct. 20, 2005

(30) Foreign Application Priority Data

May 20, 2002 (JP) .............................. 2002-144826
May 22, 2002 (JP) .............................. 2002-147214

(51) Int. Cl.
*H04N 5/46* (2006.01)
*H04N 11/20* (2006.01)

(52) U.S. Cl. .................... 348/555; 348/558; 348/441

(58) Field of Classification Search ......... 348/554–558, 348/441, 458, 705, 706; 382/298–300; 345/698, 345/699, 660, 667
See application file for complete search history.

(56) References Cited

U.S. PATENT DOCUMENTS

| | | | | |
|---|---|---|---|---|
| 5,587,928 A | * | 12/1996 | Jones et al. | 709/204 |
| 5,990,858 A | * | 11/1999 | Ozolins | 345/99 |
| 6,243,530 B1 | * | 6/2001 | Kato | 386/94 |
| 6,278,466 B1 | * | 8/2001 | Chen | 345/473 |
| 6,335,760 B1 | * | 1/2002 | Sato | 348/397.1 |
| 6,577,311 B1 | * | 6/2003 | Crosby et al. | 345/428 |
| 6,859,845 B2 | * | 2/2005 | Mate | 710/5 |
| 2003/0112367 A1 | * | 6/2003 | Kang et al. | 348/441 |
| 2003/0174243 A1 | * | 9/2003 | Arbeiter et al. | 348/384.1 |
| 2004/0027593 A1 | * | 2/2004 | Wilkins | 358/1.2 |

FOREIGN PATENT DOCUMENTS

| | | |
|---|---|---|
| JP | 2001-189897 A | 7/2001 |
| JP | 2001-257963 A | 9/2001 |
| JP | 2001-285728 A | 10/2001 |
| JP | 2001-309251 A | 11/2001 |
| JP | 2002-135621 A | 5/2002 |
| JP | 2002-135665 A | 5/2002 |

* cited by examiner

*Primary Examiner*—Victor R. Kostak
(74) *Attorney, Agent, or Firm*—Lerner, David, Littenberg, Krumholz & Mentlik, LLP

(57) ABSTRACT

A video signal processing apparatus and a video signal processing method are capable of outputting a display having a high picture quality by effectively utilizing an output resolution. A microcomputer controls a shrinkage filter, a memory and an enlargement filter to carry out a resolution conversion process of converting the signal format of a video signal into a selected output signal format depending on the output format setting of a D terminal of the video processing apparatus, and outputs the video signal.

24 Claims, 23 Drawing Sheets

| | | OUTPUT SIGNAL FORMAT | | | |
|---|---|---|---|---|---|
| | | 525i | 525p | 1125i | 750p |
| INPUT SIGNAL FORMAT | 525i | NO CONVERSION | NO CONVERSION | 601→709 | 601→709 |
| | 525p | NO CONVERSION | NO CONVERSION | 601→709 | 601→709 |
| | 1125i | 709→601 | 709→601 | NO CONVERSION | NO CONVERSION |
| | 750p | 709→601 | 709→601 | NO CONVERSION | NO CONVERSION |

PRIOR ART

FIG. 1

| OUTPUT FORMAT SETTING | INPUT SIGNAL FORMAT | | | |
|---|---|---|---|---|
| D1 | 525i | 525p | 1125i | 750p |
| D2 | 525i | 525i | | |
| D3 | 525i | 525p | 525p | |
| D4 | 525i | 525p | 1125i | 750p |
|    |      |      | 1125i |     |

PRIOR ART

FIG. 2

| OUTPUT FORMAT SETTING | 1125i FIXED | INPUT SIGNAL FORMAT | | | |
|---|---|---|---|---|---|
| | | 525i | 525p | 1125i | 750p |
| | | 1125i | | | |

F I G. 4

| OUTPUT FORMAT SETTING | INPUT SIGNAL FORMAT | | | |
|---|---|---|---|---|
| D1 | 525i | 525p | 1125i | 750p |
| D2 | | 525i | | |
| D3 | | 525p | 1125i | |
| D4 | | 750p | | |

FIG. 7
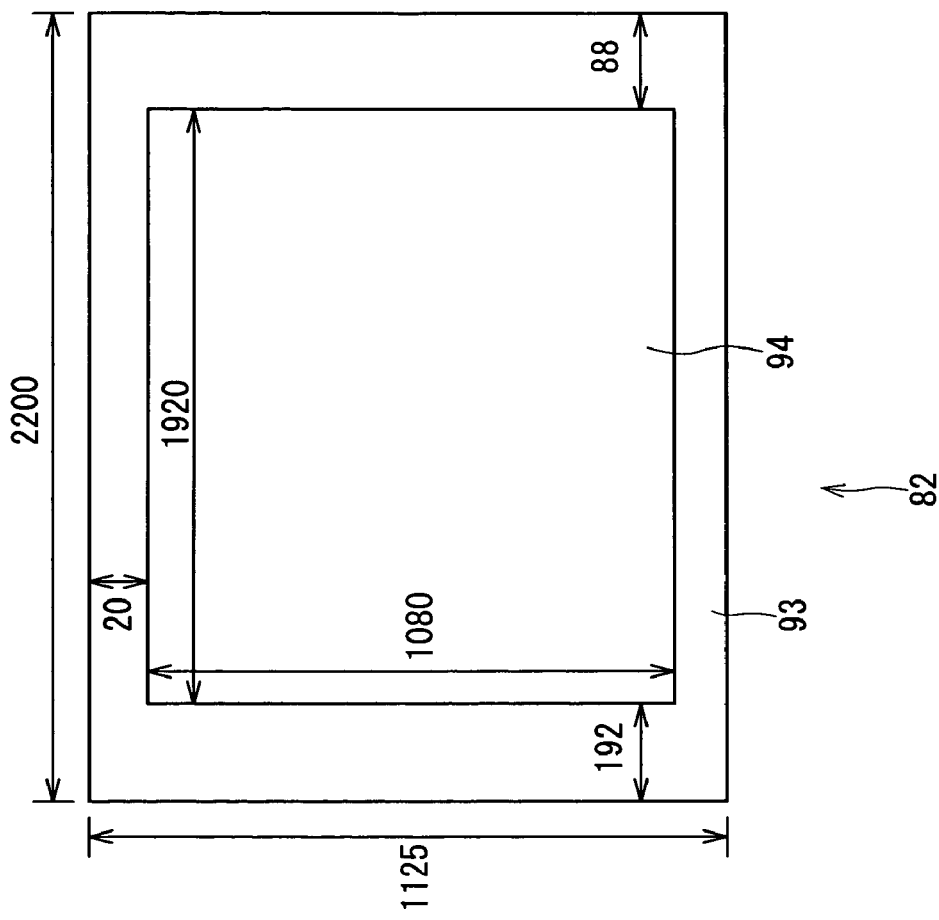
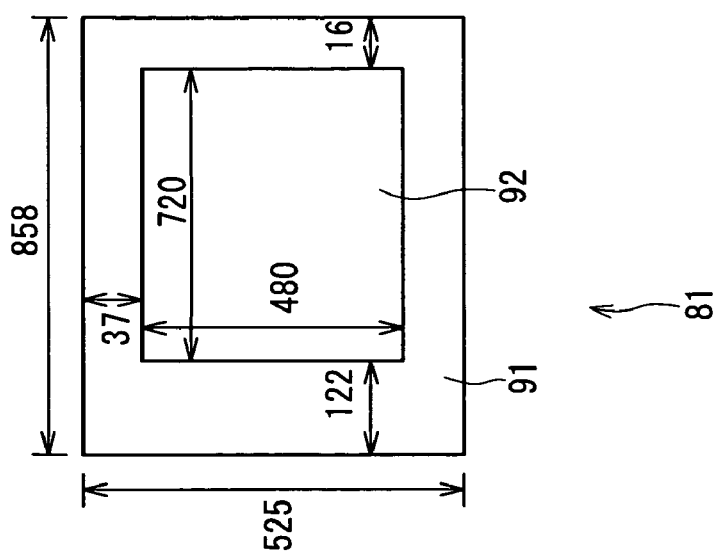

FIG. 9
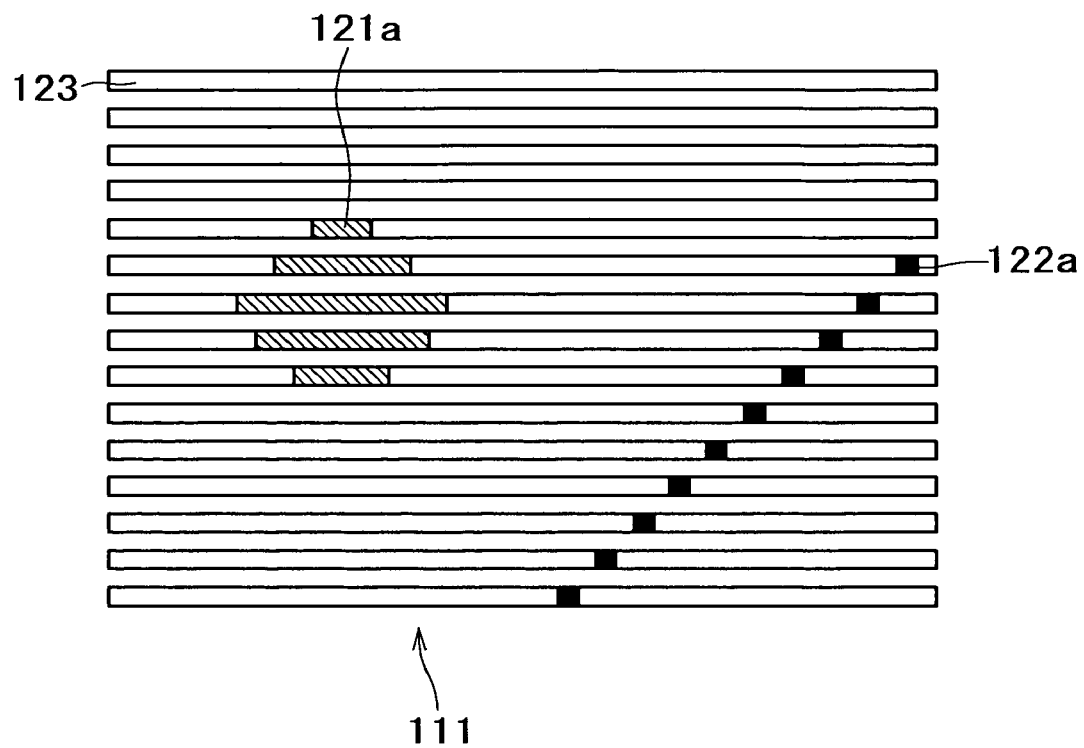
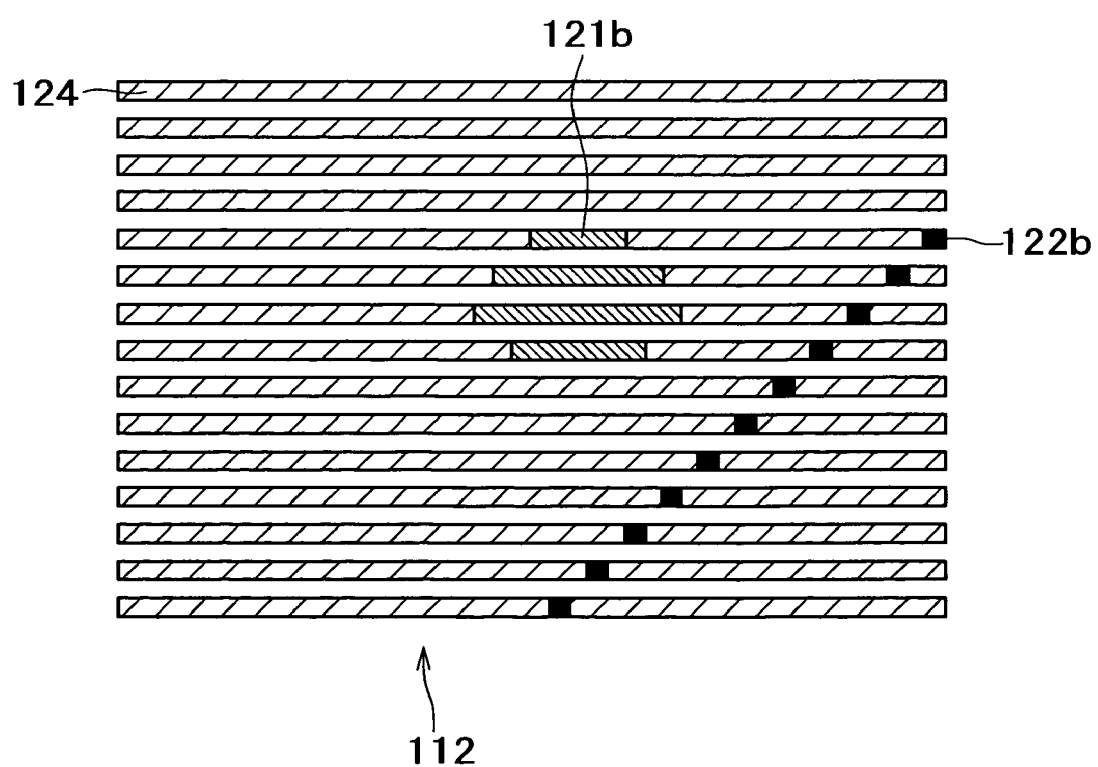

FIG. 14

| INPUT SIGNAL FORMAT | OUTPUT SIGNAL FORMAT | | | |
|---|---|---|---|---|
| | 525i | 525p | 1125i | 750p |
| 525i | NO CONVERSION | NO CONVERSION | 601→709 | 601→709 |
| 525p | NO CONVERSION | NO CONVERSION | 601→709 | 601→709 |
| 1125i | 709→601 | 709→601 | NO CONVERSION | NO CONVERSION |
| 750p | 709→601 | 709→601 | NO CONVERSION | NO CONVERSION |

FIG. 16

| OUTPUT FORMAT SETTING | INPUT SIGNAL FORMAT | | | |
|---|---|---|---|---|
| | 525i | 525p | 1125i | 750p |
| D1 | 525i | | | |
| D2 | 525p | | | |
| D3 | 1125i | | | |
| D4 | 1125i | | | 750p |

FIG. 18

| OUTPUT FORMAT SETTING | | INPUT SIGNAL FORMAT | | | |
|---|---|---|---|---|---|
| D1 | 525i | 525p | 525i | 1125i | 750p |
| D2 | | | 525p | | |
| D3 | | | 1125i | | |
| D4 | 1125i | 750p | | 1125i | 750p |

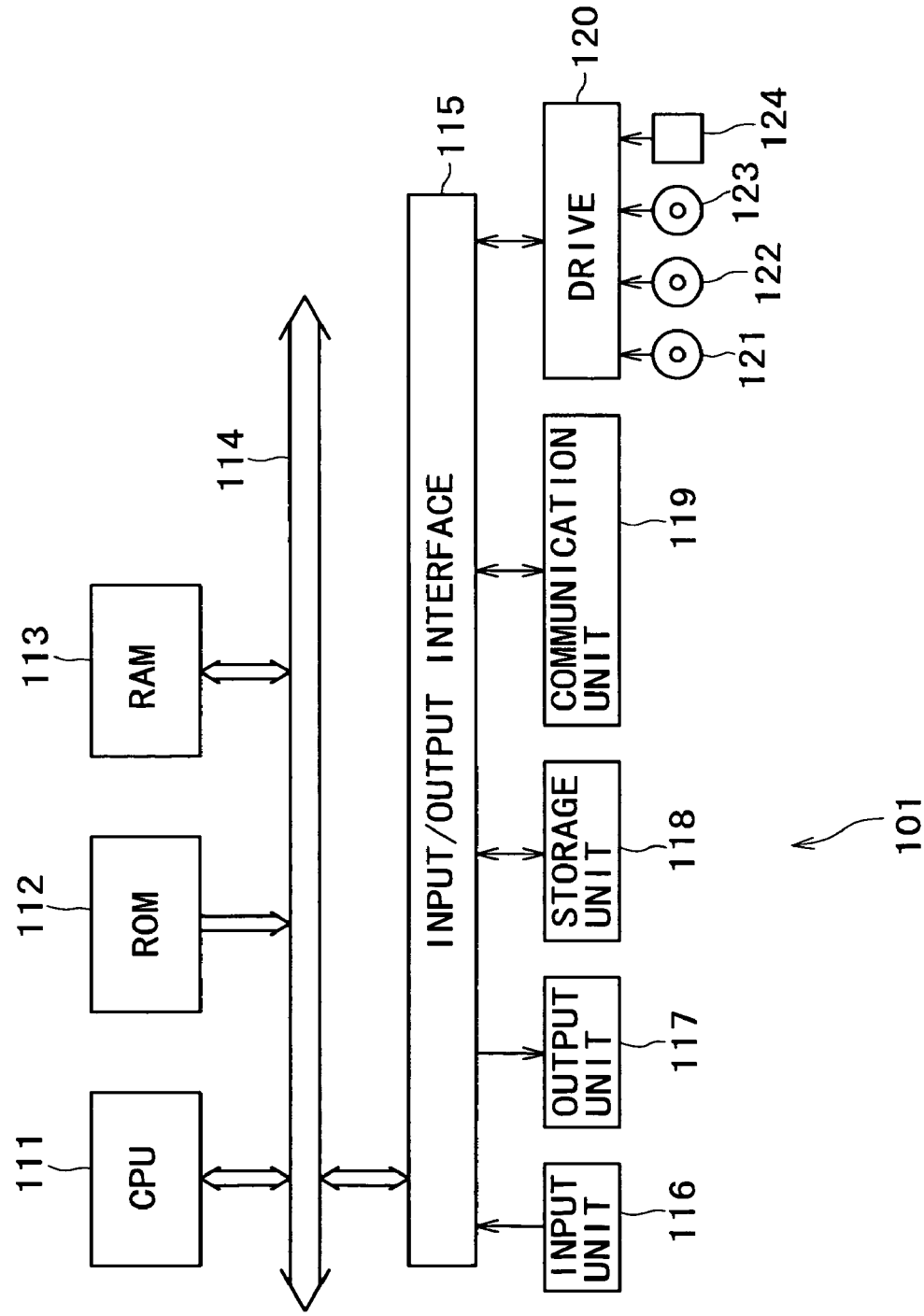

VIDEO SIGNAL PROCESSING APPARATUS AND METHOD

BACKGROUND OF THE INVENTION

The present invention relates to a video signal processing apparatus and a video signal processing method. More particularly, the present invention relates to a video signal processing apparatus and a video signal processing method which are capable of outputting a display having a high picture quality by effectively utilizing an output resolution.

In recent years, as a signal format of a video signal in broadcasting, a 525i (interlace), 525p (progressive), 1125i or 750p signal formats have been used. As a video signal output terminal for outputting the video signal from a digital video apparatus to a video signal input apparatus, a D terminal prescribed by the CP-4120 of the EIAJ (Electronic Industries Association of Japan) has been used. Examples of the digital video apparatus are a set top box (STB), a satellite tuner, a DVD (Digital Versatile Disk) apparatus and a Blu-ray disk recorder, whereas an example of the video signal input apparatus is a display apparatus.

This D terminal includes a D1 terminal for a video signal having the 535i signal format, a D2 terminal for a video signal having the 525i or 525p signal format, a D3 terminal for a video signal having the 525i, 525p or 1125i signal format and a D4 terminal for a video signal having the 525i, 525p; 1125i or 750p signal format. In each of the digital video apparatus, on the basis of the input signal format and the output setting of the D terminal, specifications of the signal format of an output video signal are determined in advance. The output setting of the D terminal is referred to hereafter as the output format setting and the signal format of an output video signal is referred to as the output format.

FIG. 1 is a diagram showing typical specifications of the D1 terminal generally used. In the typical specifications shown in FIG. 1, if the output format setting is the D1 terminal, an input video signal of any signal format is output in the 525i signal format. If the output format setting is the D2 terminal, an input video signal of the 525i signal format is output in the 525i signal format, whereas an input video signal of the 525p, 1125i or 750p signal format is output in the 525p signal format.

If the output format setting is the D3 terminal, an input video signal of the 525i signal format is output in the 525i signal format, and an input video signal of the 525p signal format is output in the 525p signal format, whereas an input video signal of the 1125i or 750p signal format is output in the 1125i signal format. If the output format setting is the D4 terminal, an input video signal of the 525i signal format is output in the 525i signal format, an input video signal of the 525p signal format is output in the 525p signal format, and an input video signal of the 1125i signal format is output in the 1125i signal format, whereas an input video signal of the 750p signal format is output in the 750p signal format.

As described above, for each of the D terminals employed in the conventional digital video apparatus like the one described above, the output signal format of the video signal is set on the basis of the input signal format of the video signal. Thus, in some cases, the output signal format of the video signal may be changed to accompany a change made to the input signal format of the video signal.

With the output format setting set at a setting for the D4 terminal, for example, assume that after a broadcast content of a 750p video signal, a broadcast content of a 525p video signal is received. In this case, the output signal format of the video signal is changed from 750p to 525p. That is to say, since the output signal format of the video signal is changed from 750p to 525p, the synchronization of the digital video apparatus goes wrong. Thus, the signal format change raises a problem that a screen appearing on a display apparatus connected to the digital video apparatus through the D terminal changes temporarily irrespective of the user's intention.

A digital video apparatus may have a video signal output terminal outputting all signal formats of a video signal at a fixed 1125i signal format, as shown in FIG. 2. That is to say, an input video signal with any format is output at the 1125i signal format at this video signal output terminal so that the digital video apparatus can output only a video signal with the 1125i signal format. Thus, this configuration raises a problem of being incapable of outputting a video signal with another format even if the other format is desired.

In addition, a D terminal employed in the conventional digital video apparatus may not necessarily output a video signal with a signal format of a maximum resolution for the D terminal. For example, assume a digital video apparatus has a D4 terminal and is capable of outputting a high resolution video signal at the 750p signal format as shown in FIG. 1. Even in this case, the digital video apparatus has a problem that the highest resolution 750p signal format of the D4 terminal cannot be utilized effectively for an input video signal with the 525p signal format because the video signal is output by lowering the resolution to a value for the 525p input signal format of the video signal.

SUMMARY OF THE INVENTION

It is thus an object of the present invention addressing the problems described above to provide a display utilizing an output resolution effectively and having high a picture quality.

A first video signal processing apparatus provided by the present invention processes a video signal and outputs the processed video signal. The video signal processing apparatus includes a video output terminal having a plurality of output settings each for outputting a video signal with at least one of a plurality of resolutions; a selection unit operable to select a desired one of the plurality of output settings; a detection unit operable to detect which of the plurality of output settings has been selected; and an output control unit operable to control output of the processed video signal in an output signal format with a highest one of the plurality of resolutions that can be output with the detected output setting without regard to an input signal format of the video signal.

In the first video signal processing apparatus, if the detection unit detects that a D4 setting has been selected as the output setting, the output signal format with the highest one of the plurality of resolutions may be a 750p signal format.

In the first video signal processing apparatus, if the detection unit detects that a D3 setting has been selected as the output setting, the output signal format with the highest one of the plurality of resolutions may be an 1125i signal format.

In the first video signal processing apparatus, if the detection unit detects that a D2 setting has been selected as the output setting, the output signal format with the highest one of the plurality of resolutions may be a 525p signal format.

In the first video signal processing apparatus, if the detection unit detects that a D1 setting has been selected as the output setting, the output signal format with the highest one of the plurality of resolutions may be a 525i signal format.

The first video signal processing apparatus may further include a comparison/determination unit operable to compare a resolution of the input format of the video signal with a resolution of the output signal format of the processed video signal and to determine the higher one. If the comparison/determination unit determines that the resolution of the output signal format is higher than the resolution of the input signal format of the video signal, the output control unit may carry out an enlargement conversion process to increase the resolution of the video signal. If the comparison/determination unit determines that the resolution of the output signal format is lower than the resolution of the input signal format of the video signal, the output control unit may carry out a shrinkage conversion process to decrease the resolution of the video signal.

The first video signal processing apparatus may further include a switching unit operable to switch the video output terminal from a present output setting to the selected output setting; a switching determination unit operable to determine whether the switching unit has switched the video output terminal from a first output setting to a second output setting, the first output setting having an output signal format with a first resolution and the second output setting having an output signal format with a resolution which is higher than the first resolution and which cannot be output by the first output setting; and an input determination unit operable to determine whether the input signal format of the video signal has a resolution which cannot be output by the first output setting if the switching determination unit determines that the video output terminal has been switched from the first output setting to the second output setting. If the input determination unit determines that the input signal format of the video signal does not have a resolution which cannot be output by the first output setting, the output control unit is operable to output the processed video signal for a predetermined period of time in an output signal format having a resolution which is higher than the first resolution and which cannot be output by the first output setting and to then output the processed video signal in an output signal format corresponding to the input signal format of the video signal.

A first video signal processing method provided by the present invention processes a video signal and outputs the processed video signal by way of a video output terminal having a plurality of output settings each for outputting a video signal with at least one of a plurality of resolutions. The video signal processing method includes selecting a desired one of the plurality of output settings; detecting which of the plurality of output settings has been selected; and controlling output of the processed video signal in an output signal format with a highest one of the plurality of resolutions that can be output with the detected output setting without regard to an input format of the video signal.

In the first video signal processing method, if the detected output setting is a D4 setting, the output signal format with the highest one of the plurality of resolutions may be a 750p signal format.

In the first video signal processing method, if the detected output setting is a D3 setting, the output signal format with the highest one of the plurality of resolutions may be an 1125i signal format.

In the first video signal processing method, if the detected output setting is a D2 setting, the output signal format with the highest one of the plurality of resolutions may be a 525p signal format.

In the first video signal processing method, if the detected output setting is a D1 setting, the output signal format with the highest one of the plurality of resolutions may be a 525i signal format.

The first video signal processing method may further include comparing a resolution of the input signal format of the video signal with a resolution of the output signal format of the processed video signal and determining the higher one. If it is determined that the resolution of the output signal format is higher than the resolution of the input signal format of the video signal, the controlling step may carry out an enlargement conversion process to increase the resolution of the video signal. If it is determined that the resolution of the output signal format is lower than the resolution of the input signal format of the video signal, the controlling step may carry out a shrinkage conversion process to decrease the resolution of the video signal.

The first video signal processing method may further include switching the video output terminal from a present output setting to the selected output setting; determining whether the video output terminal has been switched from a first output setting to a second output setting, the first output setting having an output signal format with a first resolution and the second output setting having an output signal format with a resolution which is higher than the first resolution and which cannot be output at the first output setting; and determining whether the input signal format of the video signal has a resolution which cannot be output by the first output setting if it is determined that the video output terminal has been switched from the first output setting to the second output setting. If it is determined that the input signal format of the video signal does not have a resolution which cannot be output by the first output setting, the controlling step includes outputting the processed video signal for a predetermined time in an output signal format having a resolution which is higher than the first resolution and which cannot be output by the first output setting and then outputting the processed video signal in an output signal format corresponding to the input signal format of the video signal.

A second video signal processing apparatus provided by the present invention processes a video signal and outputs the processed video signal. The video signal processing apparatus includes a video output terminal having a plurality of output settings each for outputting a video signal with at least one of a plurality of resolutions; a selection unit operable to select a desired one of the plurality of output settings; a detection unit operable to detect which of the plurality of output settings has been selected; and an output control unit operable to control output of the processed video signal in an output signal format with a highest one of the plurality of resolutions that can be output without regard to an input signal format of the video signal if the detection unit detects that a first one of the plurality of output settings has been selected, and to control output of the processed video signal in an output signal format with either the highest one of the plurality of resolutions or with a second highest one of the plurality of resolutions depending on the input signal format of the video signal if the detection unit detects that a second one of the plurality of output settings has been selected.

In the second video signal processing apparatus, the output control unit is operable to control output of the processed video signal in the 750p signal format if the detection unit detects that the second output setting has been selected and the input signal format of the video signal is 750p, and to control output of the processed video signal in the 1125i signal format if the detection unit detects that the second output setting has been selected and the input signal format of the video signal is different from the 1125i signal format.

In the second video signal processing apparatus, the output control unit is operable to control output of the processed video signal in the 750p signal format if the detection unit detects that the second output setting has been selected and the input signal format of the video signal is a signal format of a progressive format, and to control output of the processed video signal in the 1125i signal format if the detection unit detects that the second output setting has been selected and the input signal format of the video signal is a signal format of an interlace format.

The second video signal processing apparatus may further include a comparison/determination unit operable to compare a resolution of the input signal format of the video signal with a resolution of the output signal format of the processed video signal and to determine the higher one. If the comparison/determination unit determines that the resolution of the output signal format is higher than the resolution of the input signal format of the video signal, the output control unit may carry out an enlargement conversion process to increase the resolution of the video signal. If the comparison/determination unit determines that the resolution of the output signal format is lower than the resolution of the input signal format of the video signal, the output control unit may carry out a shrinkage conversion process to decrease the resolution of the video signal.

The second video signal processing apparatus may further include a switching unit operable to switch the video output terminal from a present output setting to the selected output setting; a switching determination unit operable to determine whether the switching unit has switched the video output terminal from a first output setting to a second output setting, the first output setting having an output signal format with a first resolution and the second output setting having an output signal format with a resolution which is higher than the first resolution and which cannot be output by the first output setting; and an input determination unit operable to determine whether the input signal format of the video signal has a resolution which cannot be output by the first output setting if the switching determination unit determines that the video output terminal has been switched from the first output setting to the second output setting. If the input determination unit determines that the input signal format of the video signal does not have a resolution which cannot be output by the first output setting, the output control unit is operable to output the processed video signal for a predetermined period of time in an output signal format having a resolution which is higher than the first resolution and which cannot be output by the first output setting and to then output the processed video signal in an output signal format corresponding to the input signal format of the video signal.

A second video signal processing method provided by the present invention processes a video signal and outputs the processed video signal by way of a video output terminal having a plurality of output settings each for outputting a video signal with at least one of a plurality of resolutions. The video signal processing method includes selecting a desired one of the plurality of output settings; detecting which of the plurality of output settings has been selected; and controlling output of the processed video signal in an output signal format with a highest one of the plurality of resolutions that can be output without regard to an input signal format of the video signal if the detection step detects that a first one of the plurality of output settings has been selected, and controlling output of the processed video signal in an output signal format with either the highest one of the plurality of resolutions or with a second highest one of the plurality of resolutions depending on the input signal format of the video signal if the detection step detects that a second one of the plurality of output settings has been selected.

In the second video signal processing method, the controlling step may control output of the processed video signal in the 750p signal format if the detecting step detects that the second output setting has been selected and the input signal format of the video signal is 750p, and may control output of the processed video signal in the 1125i signal format if the detecting step detects that the second output setting has been selected and the input signal format of the video signal is different from the 1125i signal format.

In the second video signal processing method, the controlling step may control output of the processed video signal in the 750p signal format if the detecting step detects that the second output setting has been selected and the input signal format of the video signal is a signal format of a progressive format, and may control output of the processed video signal in the 1125i signal format if the detecting step detects that the second output setting has been selected and the input signal format of the video signal is a signal format of an interlace format.

The second video signal processing method may further include comparing a resolution of the input signal format of the video signal with a resolution of the output signal format and determining the higher one. If it is determined that the resolution of the output signal format is higher than the resolution of the input signal format of the video signal, the controlling step may carry out an enlargement conversion process to increase the resolution of the video signal. If it is determined that the resolution of the output signal format is lower than the resolution of the input signal format of the video signal, the controlling step may carry out a shrinkage conversion process to decrease the resolution of the video signal.

The second video signal processing method may further include switching the video output terminal from a present output setting to the selected output setting; determining whether the video output signal has been switched from a first output setting to a second output setting, the first output setting having an output signal format with a first resolution and the second output setting having an output signal format with a resolution which is higher than the first resolution and which cannot be output by the first output setting; and determining whether the output signal format of the video signal has a resolution which cannot be output by the first output setting if it is determined that the video output terminal has been switched from the first output setting to the second output setting. If it is determined that the input signal format of the video signal does not have a resolution which cannot be output by the first output setting, the controlling step includes outputting the processed video signal for a predetermined time in an output signal format having a resolution which is higher than the first resolution and which cannot be output by the first output setting and then outputting the processed video signal in an output signal format corresponding to the input signal format of the video signal.

In the first invention, control is executed to output a processed video signal in an output format with a highest resolution that can be output with the detected output setting without regard to the input signal format of the video signal.

In the second invention, control is executed to output a processed video signal in an output signal format with a highest resolution that can be output without regard to the input signal format of the video signal if it is detected that a first output setting has been selected, and control is executed to output a processed video signal in an output signal format with either a highest resolution or a second highest resolution depending on the input signal format of the video signal if it is detected that a second output setting has been selected.

BRIEF DESCRIPTION OF THE DRAWINGS

FIG. 1 is a diagram showing typical specifications of an output format of the conventional output terminal;

FIG. 2 is a diagram showing other typical specifications of an output format of the conventional output terminal;

FIG. 4 is a diagram showing typical specifications of an output format of an output terminal employed in the digital video apparatus shown in FIG. 3;

FIG. 7 is an explanatory diagram referred to in describing a resolution conversion process carried out by the digital video apparatus shown in FIG. 3;

FIG. 9 is an explanatory diagram referred to in describing a signal conversion process carried out by the conversion unit employed in the digital video apparatus shown in FIG. 3;

FIG. 14 is a diagram showing a color conversion table of the digital video apparatus shown in FIG. 3;

FIG. 16 is a diagram showing other typical specifications of the output format of the output terminal employed in the digital video apparatus shown in FIG. 3;

FIG. 18 is a diagram showing further typical specifications of the output format of the output terminal employed in the digital video apparatus shown in FIG. 3;

FIG. 24 is a block diagram showing another typical configuration of the digital video apparatus applying the present invention.

DETAILED DESCRIPTION

Hereinafter, the best mode for carrying out the invention will be described.

Figure 3:
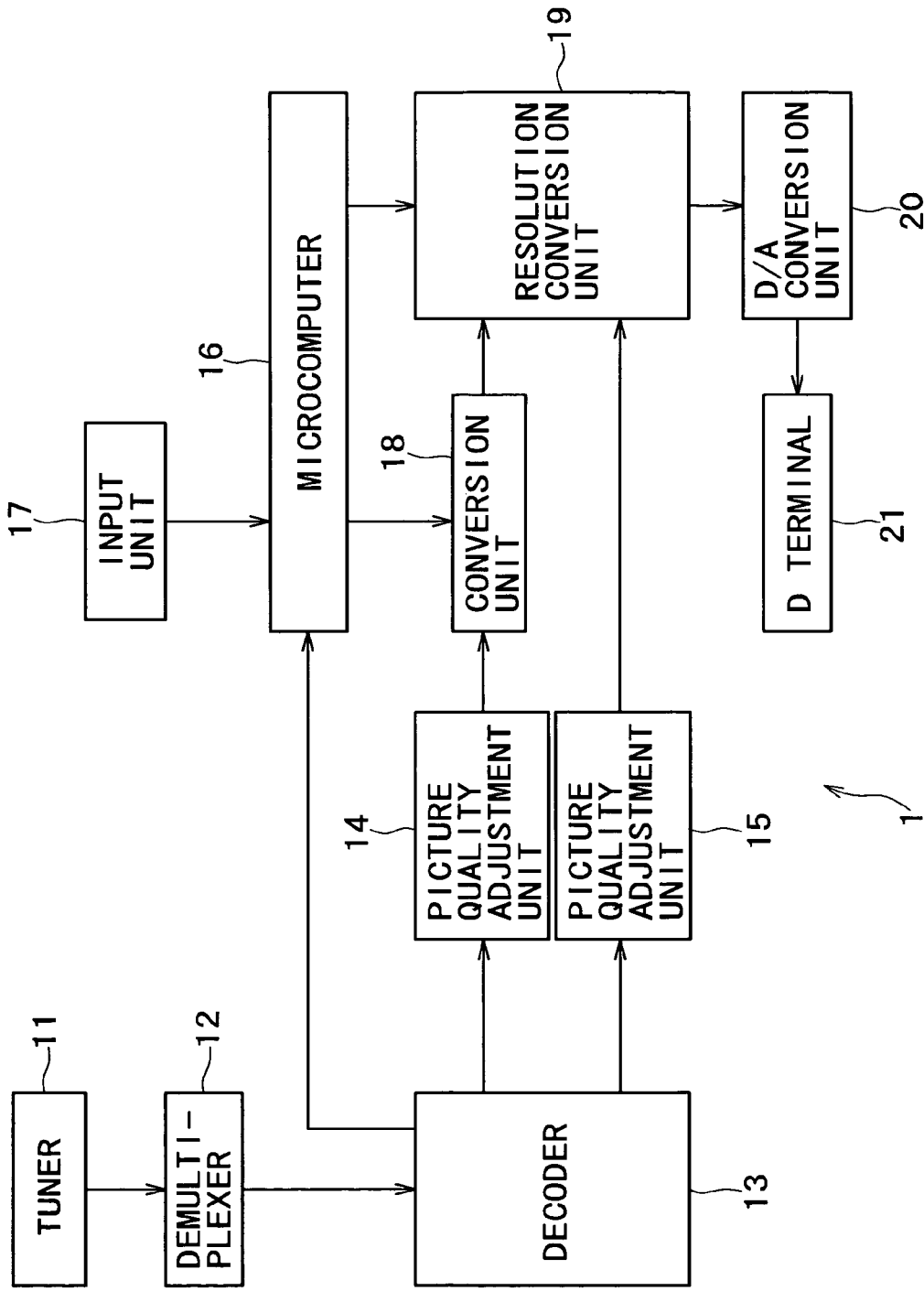
FIG. 3 is a block diagram showing a typical configuration of a digital video apparatus applying the present invention.

FIG. 3 is a block diagram showing a typical configuration of a digital video apparatus 1 applying the present invention. The typical configuration shown in FIG. 3 is explained as an example of a digital video apparatus serving as a set top box (STB). However, the digital video apparatus can serve not only as an STB, but also as a satellite tuner, a DVD (Digital Versatile Disk) apparatus and a Blu-ray disk recorder. The digital video apparatus 1 is connected to a display apparatus not shown in the figure through a D terminal 21.

A tuner 11 selects a broadcast signal received by an antenna not shown in the figure, demodulates the selected signal and outputs the demodulated signal to a demultiplexer 12. The demultiplexer 12 splits the broadcast signal into video and audio signals, supplying the video signal to a decoder 13. The video signal is a video signal completing an MPEG (Moving Picture Experts Group) compression process. It is to be noted that the audio signal is supplied to an audio decoder unit not shown in the figure to be processed.

The decoder 13 decodes the video signal into a signal in a base band in accordance with the signal format of the video signal and outputs the result of decoding to a picture quality adjustment unit 14 or 15. It is to be noted that the signal format of the broadcast signal is roughly classified into four defined signal formats, i.e., the 525i, 525p, 1125i and 750p signal formats. The number in each of the signal formats is the number of scanning lines, notation i denotes an interlace (interlaced scanning) method and notation p denotes progressive (sequential scanning) method. The resolution in these four signal formats increases in the 525i, 525p, 1125i and 750p order.

The decoder 13 outputs a video signal having the 525i signal format to the picture quality adjustment unit 14 and outputs video signals having the other formats to the picture quality adjustment unit 15. In addition, the decoder 13 supplies information on the signal format of each video signal to a microcomputer 16.

The microcomputer 16 controls other components in accordance with input signals received from an input unit 17 as input signals corresponding to operations carried out by the user. In addition, the microcomputer 16 controls a conversion unit 18 and a resolution conversion unit 19 on the basis of information received from the decoder 13 on the signal format of each video signal and the output format setting (or output setting) specified by the user as the output format setting of the D terminal 21.

The input unit 17 includes a variety of switches and buttons as well as a remote controller. The input unit 17 outputs the input signals cited above in accordance with operations carried out by the user. When a predetermined button is pressed to change the output format setting of the D terminal 21, for example, the output format setting of the D terminal 21 is supplied to the microcomputer 16.

The picture quality adjustment unit 14 or 15 removes block noises inherent in a signal completing an MPEG compression process from the video signal, and carries out processing to improve other picture qualities. The picture quality adjustment unit 14 supplies the processed video signal to the conversion unit 18. On the other hand, the picture quality adjustment unit 15 supplies the processed video signal to the resolution conversion unit 19.

In accordance with a control signal received from the microcomputer 16, the conversion unit 18 converts a video signal received from the picture quality adjustment unit 14 as a video signal having the 525i signal format into a video signal having the 525p signal format. Alternatively, the conversion unit 18 passes on the video signal having the 525i signal format to the resolution conversion unit 19 with the signal format unchanged.

In accordance with a control signal received from the microcomputer 16, the resolution conversion unit 19 carries out color and resolution conversion processes on the video signal received from the conversion unit 18 or the video signal received from the picture quality adjustment unit 15 and supplies a result of the processes to a D/A (Digital/Analog) conversion unit 20.

The D/A conversion unit 20 converts the video signal received from the resolution conversion unit 19 into an analog signal and outputs the analog signal to a display apparatus by way of the D terminal 21. The D terminal 21 includes a D1 terminal for a video signal with a 525i signal format, a D2 terminal for a video signal with a 525i or 525p signal format, a D3 terminal for a video signal with a 525i, 525p or 1125i signal format and a D4 terminal for a video signal with a 525i, 525p, 1125i or 750p signal format. On the basis of the input signal format (that is, the signal format of the input video signal) and the setting of the D terminal 21 of the digital video apparatus 1, specifications of the output signal format (that is, the signal format of the output video signal) are determined in advance as shown in FIG. 4.

FIG. 4 is a diagram showing typical specifications of the signal format of a D terminal 21 employed in the digital video apparatus 1.

In the typical specifications shown in FIG. 4, if the output format setting is the D1 terminal setting, the output signal format for input video signals of all input signal formats is the 525i signal format. If the output format setting is the D2 terminal setting, the output signal format for input video signals of all input signal formats is the 525p signal format. If the output format setting is the D3 terminal setting, the output signal format for input video signals of all input signal formats is the 1125i signal format. If the output format setting is the D4 terminal setting, the output signal format for input video signals of all input formats is the 750p signal format.

In the case of the typical specifications shown in FIG. 4, the output signal format of the video signal can be found by using the output format setting of the D terminal 21 only. That is to say, in the digital video apparatus 1, the video signal is output in a signal format with the highest resolution which can be output by the D terminal without regard to the input signal format of the video signal.

On the basis of the output format setting for the D terminal 21 like the one described above, the microcomputer 16 controls the conversion unit 18 and the resolution conversion unit 19.

Figure 5:
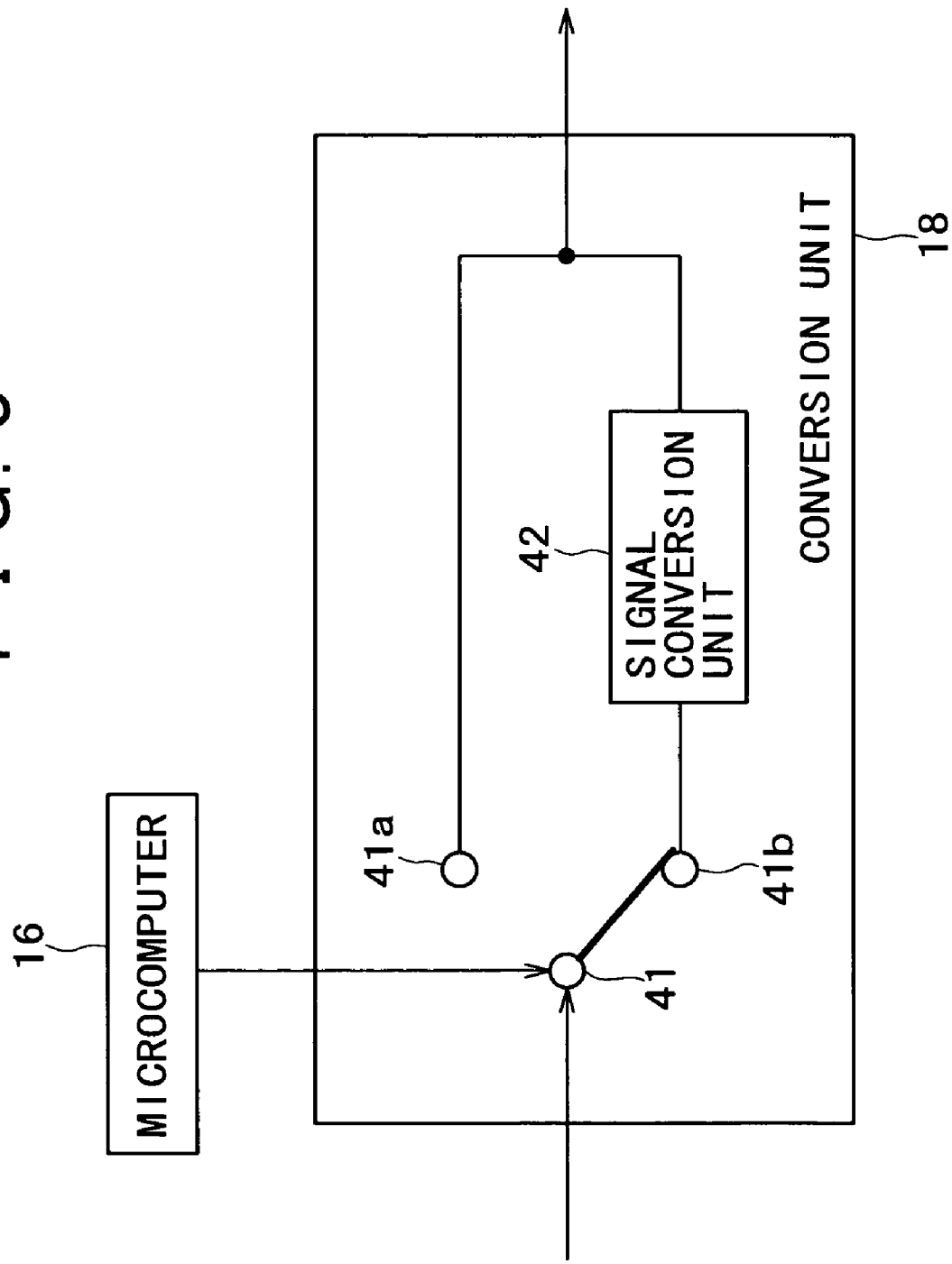
FIG. 5 is a block diagram showing a typical configuration of a conversion unit employed in the digital video apparatus shown in FIG. 3.

FIG. 5 is a block diagram showing the details of a typical configuration of the conversion unit 18. In the configuration shown in FIG. 5, the conversion unit 18 includes a switch 41 and a signal conversion unit 42.

In accordance with a control signal received from the microcomputer 16, the switch 41 selects either a switch pin 41a or 41b. When the switch 41 selects the switch pin 41a, a video signal received from the picture quality adjustment unit 14 as a video signal having the 525i signal format is supplied to the resolution conversion unit 19 with the signal format remaining unchanged. When the switch 41 selects the switch pin 41b, on the other hand, a video signal received from the picture quality adjustment unit 14 as a video signal having the 525i signal format is supplied to the signal conversion unit 42.

The signal conversion unit 42 converts the video signal received from the switch pin 41b as a video signal having the 525i signal format into a video signal having the 525p signal format by interpolation of the vertical direction resolution, and supplies the video signal having the 525p signal format to the resolution conversion unit 19.

Figure 6:
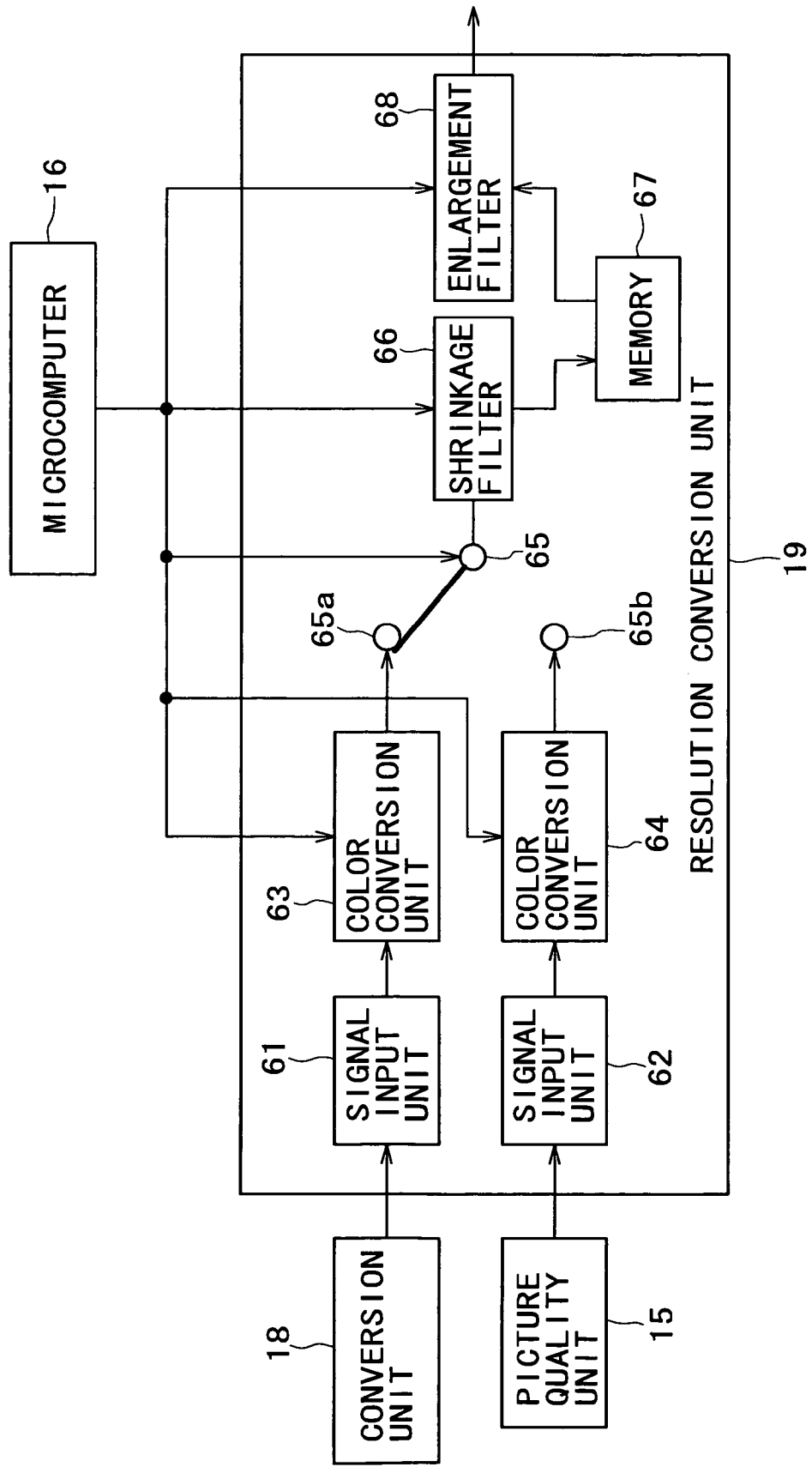
FIG. 6 is a block diagram showing a typical configuration of a resolution conversion unit employed in the digital video apparatus shown in FIG. 3.

FIG. 6 is a block diagram showing in detail a typical configuration of the resolution conversion unit 19. In the configuration shown in FIG. 6, the resolution conversion unit 19 includes signal input units 61 and 62, color conversion units 63 and 64, a switch 65, a shrinkage filter 66, a memory 67 and an enlargement filter 68.

The signal input unit 61 supplies a video signal received from the conversion unit 18 as a video signal having the 525i or 525p signal format to the color conversion unit 63. On the other hand, the signal input unit 62 supplies a video signal received from the picture quality adjustment unit 15 as a video signal having the 525p, 1125i or 750p signal format to the color conversion unit 64.

In accordance with control signals received from the microcomputer 16, the color conversion units 63 and 64 each carry out a color conversion process in case the input signal format of the video signal is different from the output signal format of the video signal. In accordance with a control signal received from the microcomputer 16, the switch 65 selects either a switch pin 65a or 65b. The switch pin 65a is a switch terminal receiving a video signal from the color conversion unit 63. On the other hand, the switch pin 65b is a switch terminal receiving a video signal from the color conversion unit 64.

In accordance with a control signal received from the microcomputer 16, the shrinkage filter 66 shrinks the video signal when a resolution conversion process is carried out to convert a high resolution into a low resolution and writes the shrunk video signal into the memory 67. On the other hand, the shrinkage filter 66 keeps the video signal unchanged when a resolution conversion process is carried out to convert a low resolution into a high resolution and writes the unchanged video signal into the memory 67. In accordance with a control signal received from the microcomputer 16, the enlargement filter 68 enlarges a video signal read out from the memory and outputs the enlarged video signal to the D/A conversion unit 20 when a resolution conversion process is carried out to convert a low resolution into a high resolution. On the other hand, the enlargement filter 68 keeps a video signal read out from the memory 67 unchanged and outputs the unchanged video signal to the D/A conversion unit 20 when a resolution conversion process is carried out to convert a high resolution into a low resolution.

The resolution conversion process carried out by the shrinkage filter 66, the memory 67 and the enlargement filter 68 is explained in detail by referring to FIG. 7. In the example shown in FIG. 7, a video signal 81 having the 525i signal format includes a blanking area 91 and an effective picture area 92, and a horizontal size of 858 and a vertical size of 525. On the other hand, a video signal 82 having the 1125i signal format includes a blanking area 93 and an effective picture area 94, and a horizontal size of 2,200 and a vertical size of 1,125.

On the basis of information received from the decoder 13 on the signal format of an input signal and the output format setting (FIG. 4) specified by the user for the D terminal 21, the microcomputer 16 compares the resolution of the input signal format of a video signal with the resolution of the output signal format of the video signal and determines which resolution is higher. If the result of the determination indicates that the resolution of the output signal format of the video signal is higher than the resolution of the input signal format of the video signal, the shrinkage filter 66, the memory 67 and the enlargement filter 68 carry out a resolution conversion process to enlarge the video signal.

Assume, for example, that the input video signal having the 525i signal format is subjected to an enlargement resolution conversion process to convert the input video signal into an output video signal having the 1125i signal format. In this case, an effective picture area 92 having a horizontal size of 720 and a vertical size of 480 is cut out from a horizontal position of 122 and vertical position of 37 of the video signal 81 and stored in the memory 67. It is to be noted that, in this case, to convert a low resolution into a high resolution, the video signal passes through the shrinkage filter 66 with its format unchanged. Then, while the effective picture area 92 is being read out from the memory 67, the effective picture area 92 is enlarged by the enlargement filter 68 to an effective picture area 94 having a horizontal size of 1,920 and a vertical size of 1,080, and is output and placed at a horizontal position of 192 and vertical position of 20 of the video signal 82. In this way, the video signal 81 having the 525i signal format is subjected to a resolution conversion process to convert the video signal 81 into the video signal 82 having the 1125i signal format.

If the result of the determination indicates that the resolution of the output signal format of the video signal is lower than the resolution of the input signal format of the video signal, on the other hand, the shrinkage filter 66, the memory 67 and the enlargement filter 68 carry out a resolution conversion process to shrink the video signal.

Assume, for example, that the input video signal having the 1125i signal format is subjected to a shrinkage resolution conversion process to convert the input video signal into an output video signal having the 525i signal format. In this case, an effective picture area 94 having a horizontal size of 1,920 and a vertical size of 1,080 is cut out from a horizontal position of 192 and vertical position of 20 of the video signal 82, is shrunk by the shrinkage filter 66 and is stored in the memory 67. Then, while the effective picture area 94 is being read out from the memory 67 by using the enlargement filter 68, the effective picture area 94 is output and placed at a horizontal position of 122 and vertical position of 37 of the video signal 81. In this way, the video signal 82 having the 1125i signal format is subjected to a resolution conversion process to convert the video signal 82 into the video signal 81 having the 525i signal format. It is to be noted that, in this case, to convert a high resolution into a low resolution, the video signal passes through the enlargement filter 68 with its format unchanged.

If the result of the determination indicates that the resolution of the input signal format of the video signal is the same as the resolution of the output signal format of the video signal, the shrinkage filter 66, the memory 67 and the enlargement filter 68 pass on the video signal to the D/A conversion unit 20 unchanged. It is to be noted that, in this case, the shrinkage filter 66 cuts out an effective picture area and writes the area into the memory 67 without change. Then, the enlargement filter 68 places the effective picture area stored in the memory 67 at a predetermined location in the video signal with its signal format unchanged, and supplies the video signal to the D/A conversion unit 20.

As described above, if the signal formats of the input and output video signals in the digital video apparatus 1 are different from each other, an effective picture area is cut out from the input video signal and enlarged or shrunk to the size of an effective picture area in the output video signal. The resultant effective picture area is set to a position prescribed in the output signal format of the video signal as the position of the effective picture area, thereby completing the resolution conversion. As a result, the video signal is output in a signal format based on specifications of an output signal format for the D terminal 21.

Figure 8:
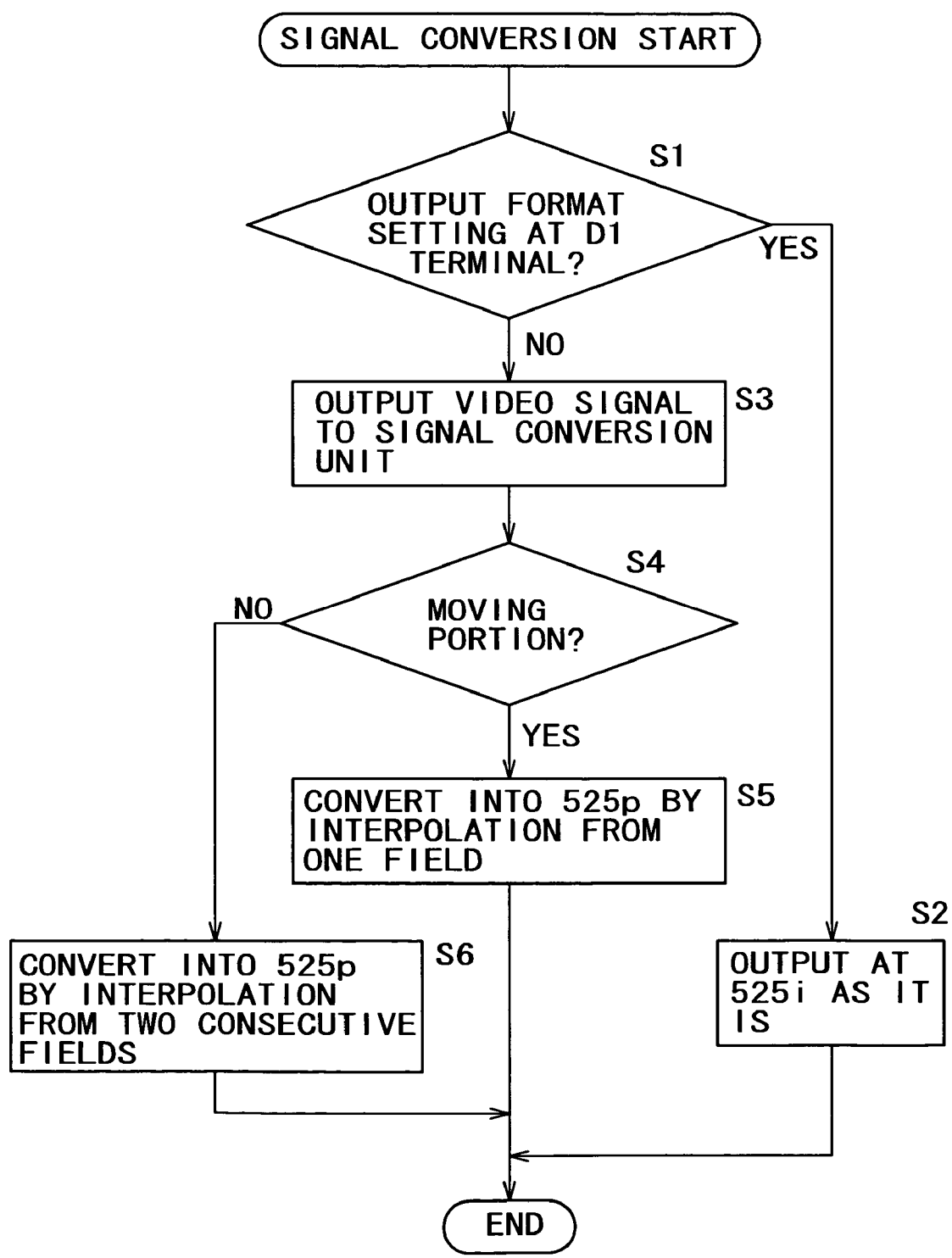
FIG. 8 shows a flowchart referred to in explaining a signal conversion process carried out by the conversion unit employed in the digital video apparatus shown in FIG. 3.

Next, a signal conversion process carried out by the conversion unit 18 employed in the digital video apparatus 1 is explained by referring to the flowchart shown in FIG. 8.

When the picture quality adjustment unit 14 receives a video signal having the 525i signal format, at step S1, the microcomputer 16 determines whether the output format setting of the D terminal 21 is the D1 terminal setting. If the output format setting of the D terminal 21 is determined to be the D1 terminal setting, then the output signal format of the video signal is determined to be 525i. Thus, the flow of the process goes on to step S2 at which the switch 41 is driven to select the switch pin 41a so that the input video signal having the 525i signal format is output to the resolution conversion unit 19 with the resolution of the 525i signal format unchanged.

If the output format setting of the D terminal 21 is determined not to be the D1 terminal setting at step S1, on the other hand, the flow of the process goes on to step S3. At step S3, the switch 41 is driven to select the switch pin 41b so that the input video signal having the 525i signal format is output to the signal conversion unit 42. That is to say, since the output format setting of the D terminal 21 is determined to be the D2 terminal setting, the video signal is determined to be 525p. Thus, the signal conversion unit 42 carries out the processing of step S4 and the subsequent steps to convert the input video signal having the 525i signal format into an output video signal having the 525p signal format.

Details of the processing carried out at step S4 and the subsequent steps are explained by referring to FIGS. 9 to 12. FIG. 9 is a diagram showing a typical field picture which is continuous on a time basis.

On scanning lines 123 in a field picture 111, picture portions 121a and 122a are created. On scanning lines 124 in a field picture 112 serving as a time-based continuous subsequence of the field picture 111, picture portions 121b and 122b correspond to the picture portions 121a and 122a, respectively, in the field picture 111. In the example shown in FIG. 9, the picture portions 121a and 121b represent a moving picture portion, the position of which moves. On the other hand, the picture portions 122a and 122b represent a still picture portion.

Figure 10:
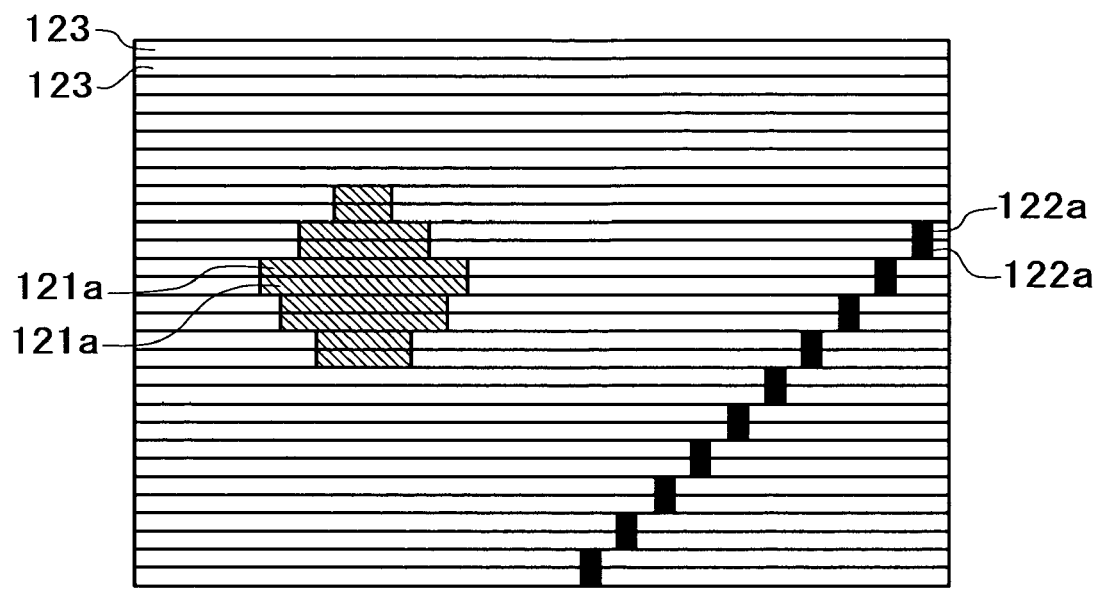
FIG. 10 is an explanatory diagram referred to in describing a signal conversion process carried out by the conversion unit employed in the digital video apparatus shown in FIG. 3.

In the processing carried out at step S4 and the subsequent steps, the signal conversion unit 42 converts the video signal having the 525i signal format into a video signal having the 525p signal format by interpolation of the vertical direction resolution. In this case, if the signal format of the single field picture 111 (FIG. 9) is simply converted into the 525p signal format with a doubled number of scanning lines by using an enlargement filter, it is feared that the block appearances of the picture portions 121a and 122a will be striking, as shown in FIG. 10. In particular, the block appearance of the still picture portion 122a will be prominent.

Figure 11:
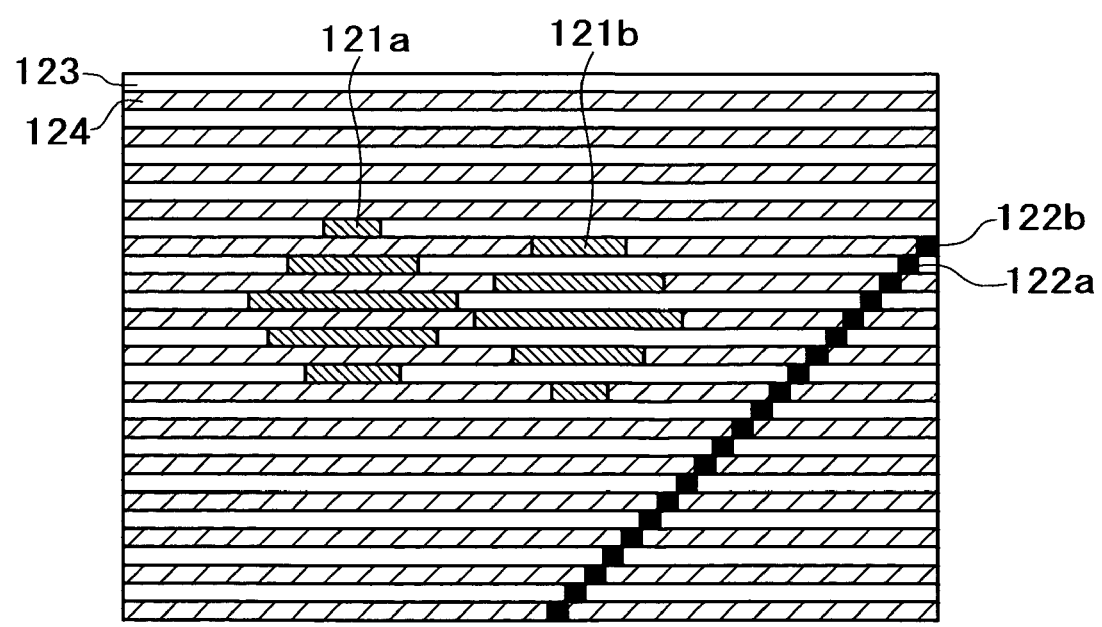
FIG. 11 is an explanatory diagram referred to in describing a signal conversion process carried out by the conversion unit employed in the digital video apparatus shown in FIG. 3.
Figure 12:
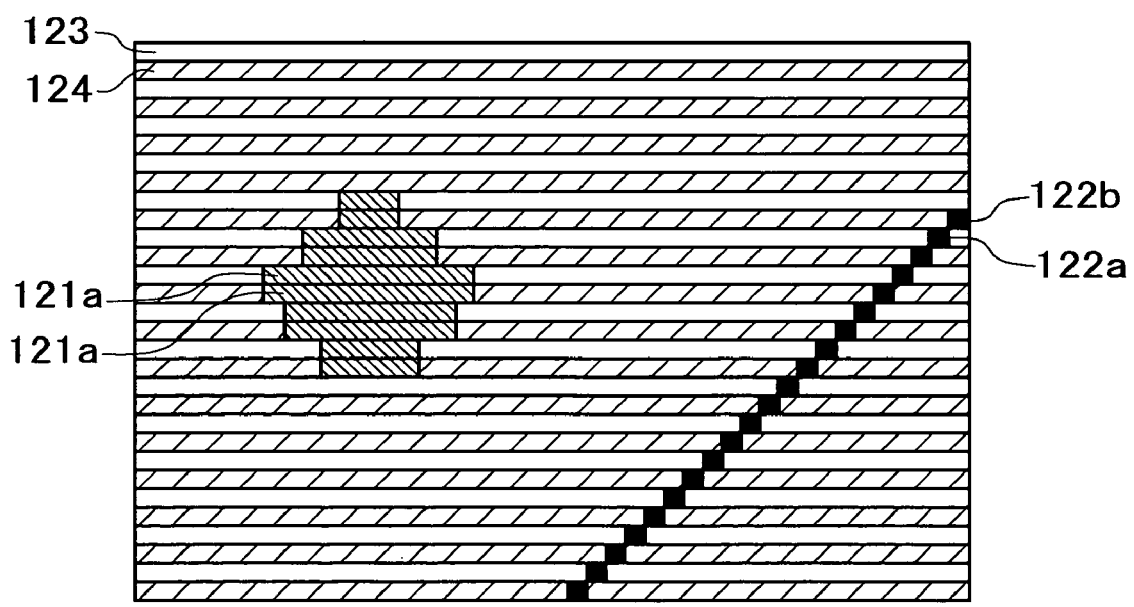
FIG. 12 is an explanatory diagram referred to in describing a signal conversion process carried out by the conversion unit employed in the digital video apparatus shown in FIG. 3.

On the other hand, if the field picture 111 and the field picture 112 serving as a time-based continuous subsequence of the field picture 111 (FIG. 9) are inserted into each other to generate a field picture with a doubled number of scanning lines for each of the field pictures 111 and 112 in a process to convert the 525i signal format into the 525p signal format, it is feared that, even though the still picture portions 122*a* and 122*b* will be converted into a smooth picture due to the fact that the vertical direction resolution will be doubled, the picture portions 121*a* and 121*b* of the moving picture will be drawn at two locations, as shown in FIG. 11.

To solve this problem, at step S4, the signal conversion unit 42 determines whether each pixel in the two field pictures 111 and 112 of the video signal is a pixel of a moving portion. If each pixel in the two field pictures 111 and 112 of the video signal is determined at step S4 to be a pixel of a moving portion, the flow of the process goes on to step S5. At step S5, the signal conversion unit 42 converts the moving portion into a video signal having the 525p signal format with a doubled number of scanning lines, as shown in FIG. 10, by simply passing the moving portion through an enlargement filter for doubling the single field picture 111 in the vertical direction.

If each pixel in the two field pictures 111 and 112 of the video signal is determined at step S4 not to be a pixel of a moving portion (i.e., a pixel of a still portion), on the other hand, the flow of the process goes on to step S6. At step S6, the signal conversion unit 42 carries out a resolution conversion process to convert the 525i signal format into the 525p signal format by inserting the field picture 111 and the field picture 112 serving as a time-based continuous subsequence of the field picture 111 into each other to generate a field picture with a doubled number of scanning lines for each of the field pictures 111 and 112, as shown in FIG. 11.

By carrying out the resolution conversion process as described above, as shown in FIG. 12, the resolutions of the still picture portions 122*a* and 122*b* are doubled, whereas the moving picture portion 121*a* can be interpolated as a single picture portion.

Figure 13:
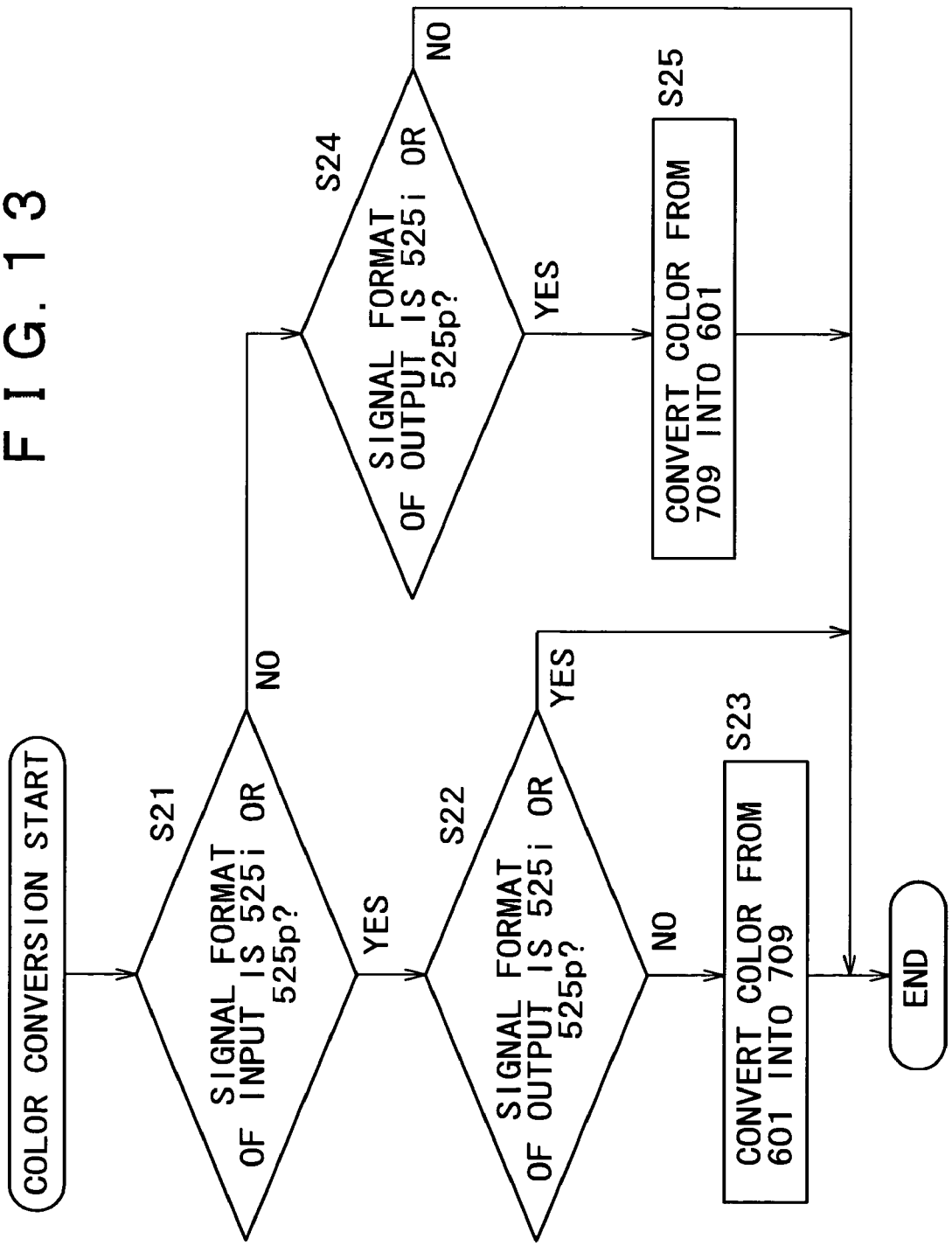
FIG. 13 shows a flowchart referred to in explaining a color conversion process carried out by the resolution conversion unit employed in the digital video apparatus shown in FIG. 3.

Next, a color conversion process carried out by the digital video apparatus 1 is explained by referring to the flowchart shown in FIG. 13. It is to be noted that while the flowchart shown in FIG. 13 represents the color conversion process carried out by the color conversion unit 63, the flowchart can be regarded as a flowchart representing the color conversion process carried out by the color conversion unit 64. This is because the basic configuration of the color conversion unit 64 is identical with that of the color conversion unit 63 except that the color conversion unit 63 and the color conversion unit 64 have different signal input units and different input signal formats. More particularly, the color conversion unit 64 receives an input video signal having the 525p, 1125i or 750p signal format from the signal input unit 62 while the color conversion unit 63 receives an input video signal having the 525i or 525p signal format from the signal input unit 61.

The signal input unit 61 supplies a video signal having a signal format obtained as a result of conversion in the conversion unit 18 to the color conversion unit 63. At step S21, the microcomputer 16 determines whether the input signal format of the video signal is 525i or 525p on the basis of information generated by the decoder 13 on the input signal format of the video signal.

If the input signal format of the video signal is determined to be 525i or 525p at step S21, the flow of the process goes on to step S22. At step S22, the microcomputer 16 determines whether the output signal format of the video signal is 525i or 525p on the basis of the output format setting (FIG. 4) specified by the user for the D terminal 21. If the output format setting for the D terminal 21 is the D1 terminal or D2 terminal setting, the output signal format of the video signal is determined to be 525i or 525p. If the output format setting for the D terminal 21 is the D3 terminal or D4 terminal setting, on the other hand, the output signal format of the video signal is determined to be 1125i or 750p. (That is, the output signal format of the video signal is determined to be neither 525i nor 525p.)

If the output signal format of the video signal is determined at step S22 to be neither 525i nor 525p, the flow of the process goes on to step S23. At step S23, the color conversion unit 63 converts the color format of the video signal from a color format prescribed by 601 specifications into a color format prescribed by 709 specifications on the basis of a color conversion table shown in FIG. 14.

If the input signal format of the video signal is determined to be neither 525i nor 525p at step S21, on the other hand, the flow of the process goes on to step S24. At step S24, the microcomputer 16 determines whether the output signal format of the video signal is 525i or 525p on the basis of the output format setting of the D terminal 21. If the output signal format of the video signal is determined at step S24 to be 525i or 525p, the flow of the process goes on to step S25. At step S25, the color conversion unit 63 converts the color format of the video signal from a color format prescribed by the 709 specifications into a color format prescribed by the 601 specifications on the basis of the color conversion table shown in FIG. 14.

If the output signal format of the video signal is determined at step S22 to be 525i or 525p or if the output signal format of the video signal is determined at step S24 to be neither 525i nor 525p, on the other hand, no color conversion process is carried out since the color format of the input video signal is the same as the color format of the output video signal.

The color conversion process mentioned above is explained in detail by referring to FIG. 14.

FIG. 14 is a diagram showing the color conversion table. The color format of a video signal having the 525i or 525p signal format is prescribed by CCIR-REC 601 (CCIR: International Radio Consultative Committee), whereas the color format of a video signal having the 1125i or 750p signal format is prescribed by CCIR-REC 709. The color conversion unit 63 carries out a color conversion process in accordance with the prescriptions of a variety of signal formats. Thus, the signal format of an input video signal is compared with the signal format of an output video signal and a color conversion process is carried out only if the prescribed color formats of the signals are different from each other.

In accordance with the table shown in FIG. 14, if the input signal format of the video signal is 525i or 525p and the output signal format of the video signal is also 525i or 525p, no color conversion process is carried out since the color format of the input video signal is the same as the color format of the output video signal. If the input signal format of the video signal is 525i or 525p but the output signal format of the video signal is 1125i or 750p, on the other hand, the color format of the video signal is converted from a color format prescribed by the 601 specifications into a color format prescribed by the 709 specifications.

If the input signal format of the video signal is 1125i or 750p but the output signal format of the video signal is 525i or 525p, the color format of the video signal is converted from a color format prescribed by the 709 specifications into a color format prescribed by the 601 specifications. If the input signal format of the video signal is 1125i or 750p and the output signal format of the video signal is also 1125i or 750p, no color conversion process is carried out since the color format of the input video signal is the same as the color format of the output video signal.

Figure 15:
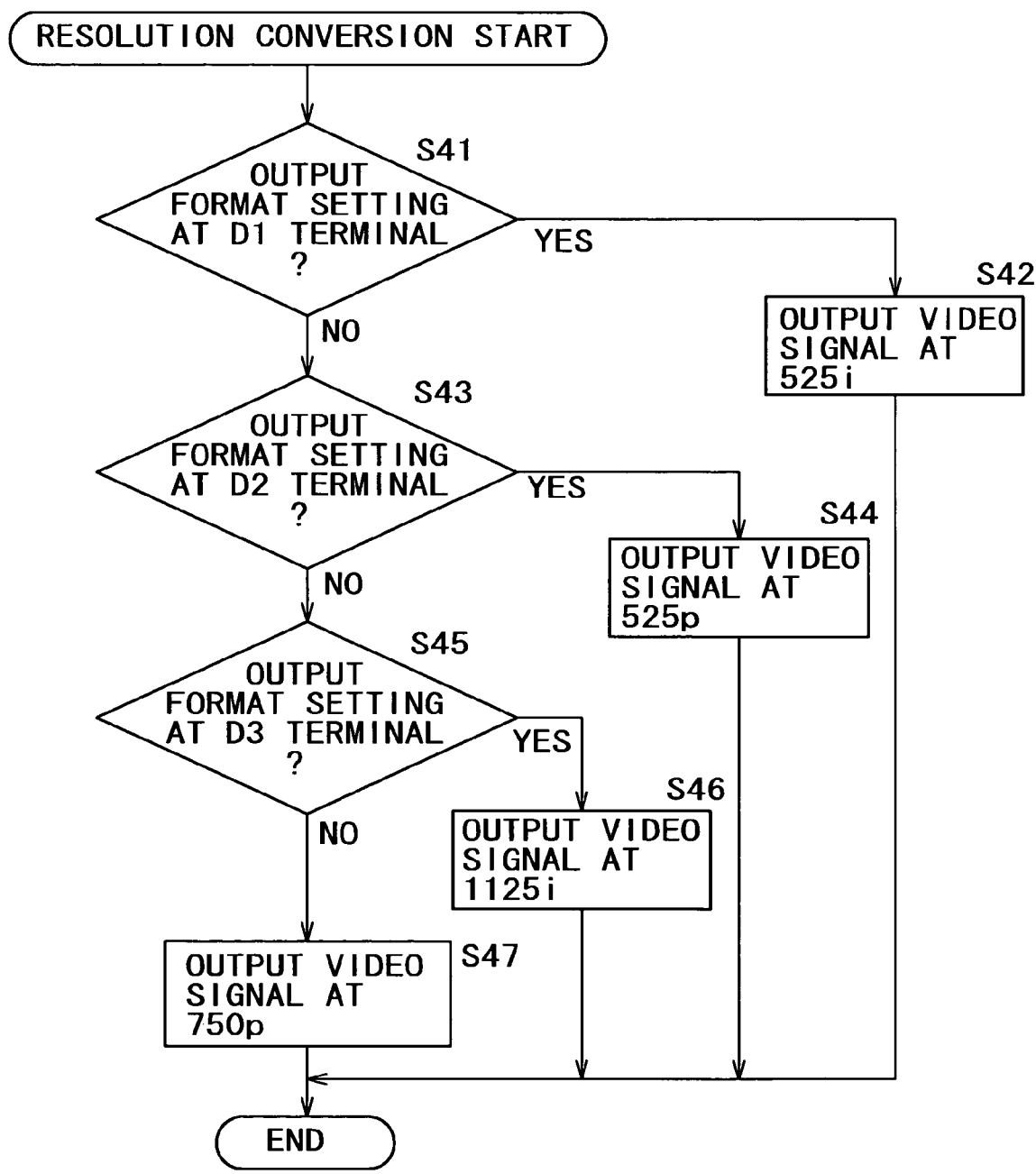
FIG. 15 shows a flowchart referred to in explaining a resolution conversion process carried out by the resolution conversion unit employed in the digital video apparatus shown in FIG. 3.

Next, a resolution conversion process carried out by the resolution conversion unit 19 in the digital video apparatus 1 is explained by referring to the flowchart shown in FIG. 15. The resolution conversion process is carried out for the signal format of an output video signal on the basis of the output format setting of the D terminal 21 as shown in FIG. 4.

In accordance with a control signal generated by the microcomputer 16, the switch 65 receives a video signal from the color conversion unit 63 at the switch pin 65a or a video signal from the color conversion unit 64 at the switch pin 65b and supplies the video signal to the shrinkage filter 66.

At step S41, the microcomputer 16 determines whether the output format setting specified by the user as the output format setting of the D terminal 21 is the D1 terminal setting. If the output format setting of the D terminal 21 is determined to be the D1 terminal setting, the flow of the process goes on to step S42. At step S42, the microcomputer 16 controls the shrinkage filter 66, the memory 67 and the enlargement filter 68 to convert the output signal format of the video signal into the 525i signal format and supplies the output video signal to the D/A conversion unit 20.

More particularly, as explained earlier by referring to FIG. 7, in the case where an input video signal having the 1125i signal format is input, for example, the shrinkage filter 66 cuts out an effective picture area and shrinks the area into the 525i signal format before writing the area into the memory 67. Then, the enlargement filter 68 places the effective picture area at a predetermined position in the video signal having the 525i signal format and outputs the video signal unchanged, with the effective picture area placed at the predetermined position, to the D/A conversion unit 20.

If the output format setting of the D terminal 21 is determined not to be the D1 terminal setting at step S41, on the other hand, the flow of the process goes on to step S43. At step S43, the microcomputer 16 determines whether the output format setting specified by the user as the output format setting of the D terminal 21 is the D2 terminal setting. If the output format setting of the D terminal 21 is determined at step S43 to be the D2 terminal setting, the flow of the process goes on to step S44. At step S44, the microcomputer 16 controls the shrinkage filter 66, the memory 67 and the enlargement filter 68 to carry out a resolution conversion process of converting the output signal format of the video signal into the 525p signal format and supplies the output video signal to the D/A conversion unit 20.

More particularly, as explained earlier by referring to FIG. 7, in the case where an input video signal having the 525i signal format is input, for example, the shrinkage filter 66 cuts out an effective picture area and writes the area into the memory 67 unchanged. Then, the enlargement filter 68 enlarges the effective picture area to the 525p signal format, places the effective picture area at a predetermined position in the video signal having the 525p signal format and outputs the video signal to the D/A conversion unit 20.

If the output format setting of the D terminal 21 is determined not to be the D2 terminal setting at step S43, on the other hand, the flow of the process goes on to step S45. At step S45, the microcomputer 16 determines whether the output format setting specified by the user as the output format setting of the D terminal 21 is the D3 terminal setting. If the output format setting of the D terminal 21 is determined at step S45 to be the D3 terminal setting, the flow of the process goes on to step S46. At step S46, the microcomputer 16 controls the shrinkage filter 66, the memory 67 and the enlargement filter 68 to carry out a resolution conversion process of converting the output signal format of the video signal into the 1125i signal format and supplies the output video signal to the D/A conversion unit 20.

If the output format setting of the D terminal 21 is determined at step S45 not to be the D3 terminal setting, that is, if the output format setting of the D terminal 21 is the D4 terminal setting, on the other hand, the flow of the process goes on to step S47. At step S47, the microcomputer 16 controls the shrinkage filter 66, the memory 67 and the enlargement filter 68 to carry out a resolution conversion process of converting the output signal format of the video signal into the 750p signal format and supplies the output video signal to the D/A conversion unit 20.

As described above, the video signal is output in a format set with the highest resolution for the D terminal without regard to the input signal format of the video signal. Thus, it is possible to display a video signal having a high picture quality effectively utilizing the resolution that can be offered by the video signal processing apparatus. In addition, since the synchronization of the digital video apparatus can be prevented from going wrong even if the input signal format of the video signal is changed, it is possible to suppress a temporary change in the display screen as a change irrelevant to the intention of the user.

In the above description, the output format setting shown in FIG. 4 as the output format setting of the D terminal 21 is explained. However, the digital video apparatus 1 may also use other typical specifications shown in FIG. 16 as the output format setting of the D terminal 21.

FIG. 16 is a diagram showing other typical specifications of the output signal format for the output terminal D2 1 employed in the digital video apparatus 1. In accordance with the other typical specifications shown in FIG. 16, if the output format setting is the D1 terminal setting, a video signal with any input signal format is output as a signal having the 525i signal format. If the output format setting is the D2 terminal setting, a video signal with any input signal format is output as a signal having the 525p signal format. If the output format setting is the D3 terminal setting, a video signal with any input signal format is output as a signal having the 1125i signal format.

If the output format setting is the D4 terminal setting, a video signal with the 750p input signal format is output as a signal having the 750p signal format, whereas a video signal with an input signal format other than the 750p signal format (that is, a video signal with the 525i, 525p or 1125i input signal format) is output as a signal having the 1125i signal format.

Figure 17:
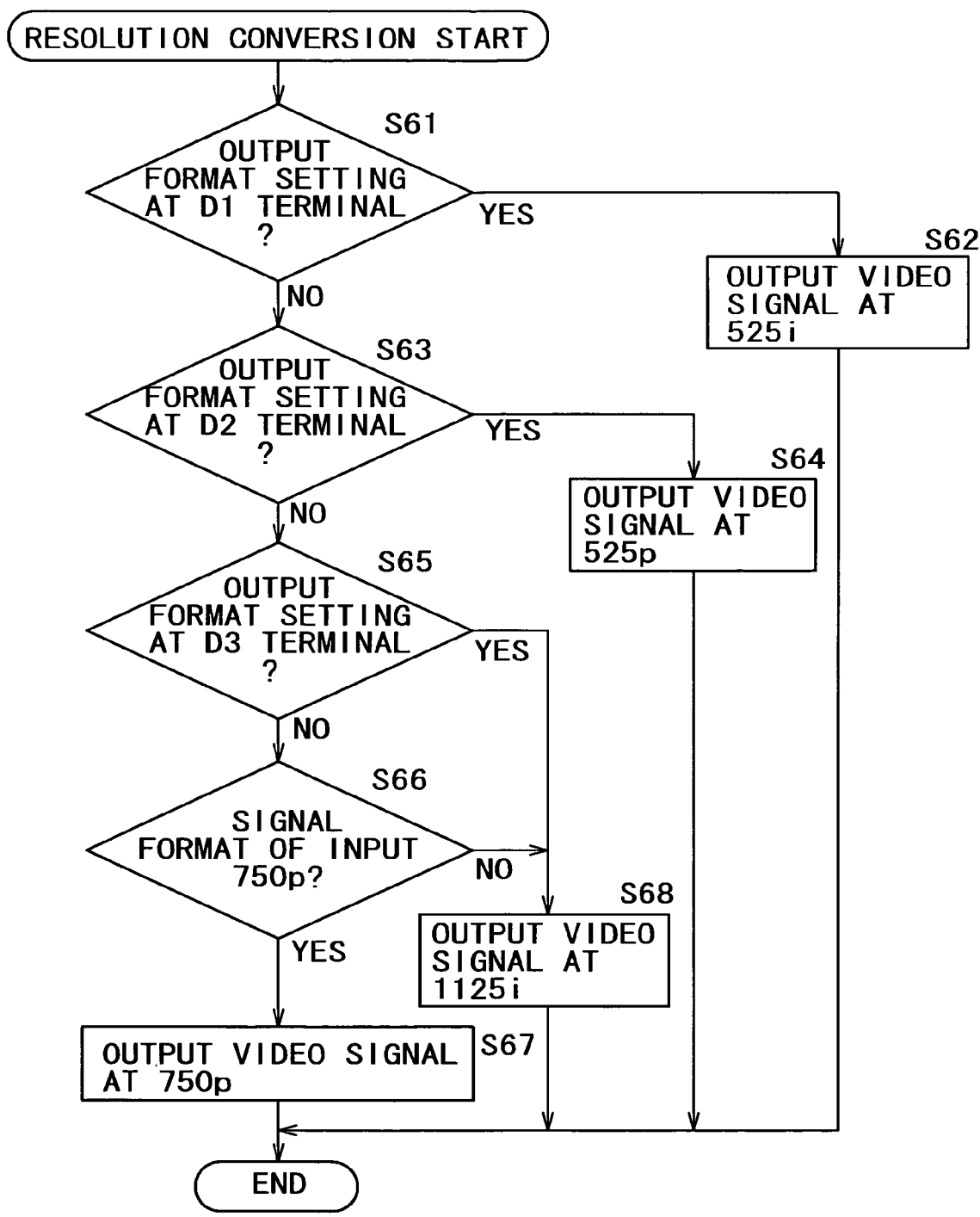
FIG. 17 shows a flowchart referred to in explaining another resolution conversion process carried out by the resolution conversion unit employed in the digital video apparatus shown in FIG. 3.

By referring to the flowchart shown in FIG. 17, the following description explains another typical resolution conversion process carried out by the digital video apparatus 1 on the basis of the output format settings shown in FIG. 16 as the output format setting of the D terminal 21.

The processing carried out at steps S61 to S65 are identical with those of steps S41 to S45 of the flowchart shown in FIG. 15 so that their explanations are not repeated to avoid duplications.

At step S65, the microcomputer 16 determines whether the output format setting specified by the user as the output format setting of the D terminal 21 is the D3 terminal setting. If the output format setting of the D terminal 21 is determined at step S65 not to be the D3 terminal setting (that is, if the output format setting of the D terminal 21 is the D4 terminal setting), the flow of the process goes on to step S66. At step S66, the microcomputer 16 determines whether the input signal format of the video signal is 750p on the basis of information received from the decoder 13 on the input signal format of the video signal.

If the input signal format of the video signal is determined at step S66 to be 750p, the flow of the process goes on to step S67. At step S67, the microcomputer 16 controls the shrinkage filter 66, the memory 67 and the enlargement filter 68 to carry out a resolution conversion process of converting the output signal format of the video signal into the 750p signal format and supplies the output video signal to the D/A conversion unit 20.

If the output format setting of the D terminal 21 is determined at step S65 to be the D3 terminal setting or if the input signal format of the video signal is determined at step S66 not to be 750p, the flow of the process goes on to step S68. At step S68, the microcomputer 16 controls the shrinkage filter 66, the memory 67 and the enlargement filter 68 to carry out a resolution conversion process of converting the output signal format of the video signal into the 1125i signal format and supplies the output video signal to the D/A conversion unit 20.

As is obvious from the above description, if the output format setting is the D4 terminal setting, a video signal with an input signal format other than the 750p signal format is output as a signal having the 1125i signal format. It is thus possible to prevent the picture quality from deteriorating due to a conversion process adopting an interlace (interlaced scanning) method or a progressive (sequential scanning) method. Further, it is also possible to prevent the deterioration of the picture quality due to conversion of the 525p signal format into 750p.

In addition, the digital video apparatus 1 may also use further typical specifications shown in FIG. 18 as the output format setting of the D terminal 21. It is to be noted that, in this case, at step S66, the microcomputer 16 determines whether the input signal format of the video signal is 525p or 750p.

FIG. 18 is a diagram showing further typical specifications of the output signal format for the output terminal D2 1 employed in the digital video apparatus 1. In accordance with the further typical specifications shown in FIG. 18, if the output format setting is the D1 terminal setting, a video signal with any input signal format is output as a signal having the 525i signal format. If the output format setting is the D2 terminal setting, a video signal with any input signal format is output as a signal having the 525p signal format. If the output format setting is the D3 terminal setting, a video signal with any input signal format is output as a signal having the 1125i signal format.

If the output format setting is the D4 terminal setting, a video signal with the 525p or 750p input signal format is output as a signal having the 750p signal format, whereas a video signal with any of the input signal formats other than the 525p or 750p signal format (that is, a video signal with the 525i or 1125i input signal format) is output as a signal having the 1125i signal format.

As is obvious from the above description, an input video signal with a signal format other than 525p or 750p is converted into an output video signal having the 1125i signal format only if the output format setting is the D4 terminal setting. It is thus possible to prevent the picture quality from deteriorating due to a conversion process adopting an interlace (interlaced scanning) method and a progressive (sequential scanning) method.

It is to be noted that, even in accordance with the typical specifications shown in FIG. 16 or 18 as the output format setting of the D terminal 21, it is thus possible to display a video signal having a high picture quality effectively utilizing the resolution that can be offered by the video signal processing apparatus if the output format setting is any one of the D1 terminal setting to the D3 terminal setting. In addition, the synchronization of the digital video apparatus can be prevented from going wrong even if the input signal format of the video signal is changed.

In the above description, the NTSC (National Television System Committee) method is assumed. However, the above description also holds true for a PAL (Phase Alternating Line) method. In the case of the PAL method, the video signal can be output in a 625p signal format on the basis of the output terminal setting without regard to the input signal format of the video signal.

The present invention can be applied not only to the D1 to D4 terminals, but also to a D5 terminal or another video signal output terminal.

Figure 19:
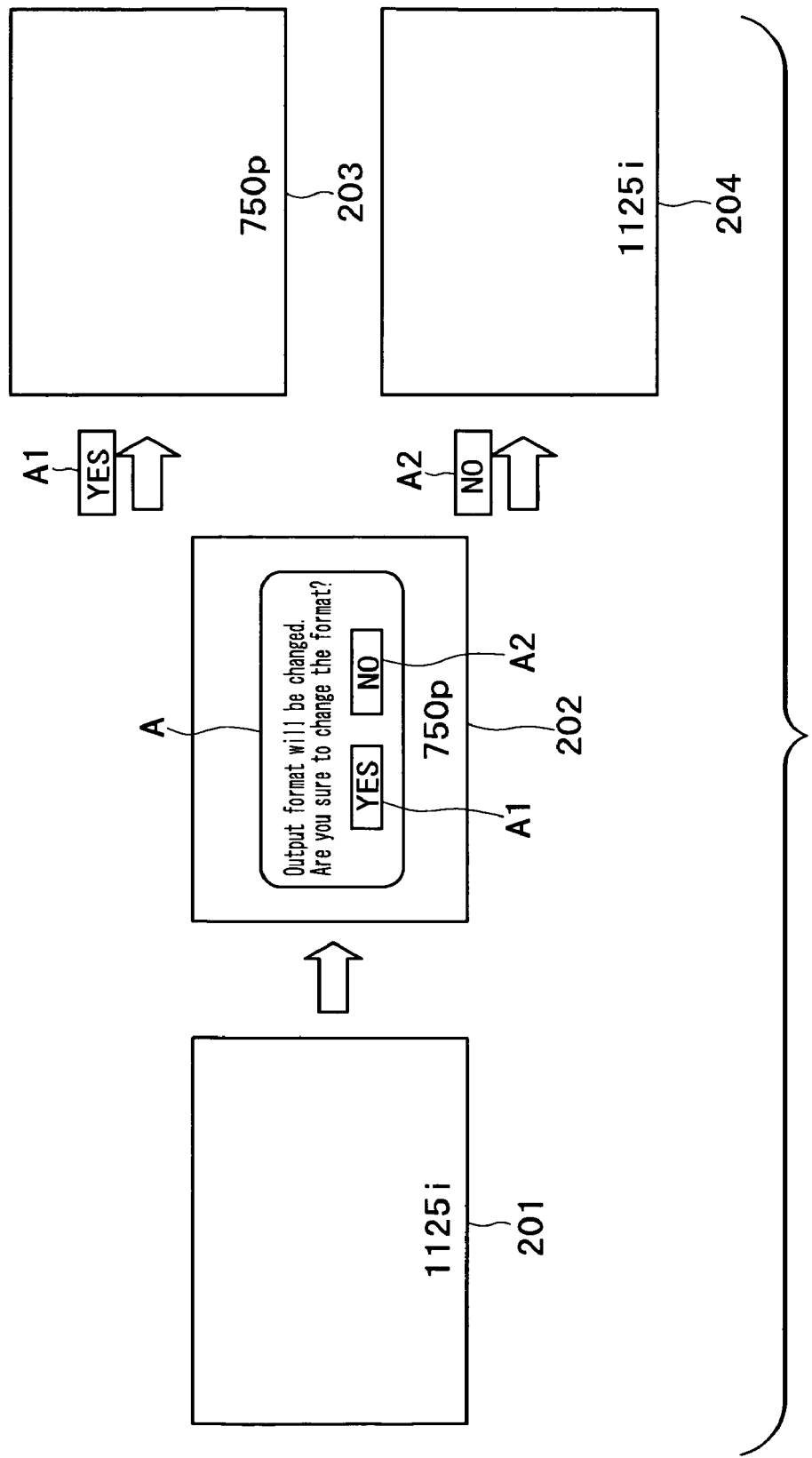
FIG. 19 is a diagram showing typical screen displays for an output setting change.

By the way, assume a video signal apparatus in which, for example, if the output format setting of the D terminal is the D3 terminal setting, an input video signal having the 1125i or 750p signal format is set to be output as a video signal having the 1125i signal format as shown in FIG. 1, and if the output format setting of the D terminal is the D4 terminal setting, an input video signal having the 1125i signal format is set to be output as a video signal having the 1125i signal format, whereas an input video signal having the 750p signal format is set to be output as a video signal having the 750p signal format, also as shown in FIG. 1. A process to change the output format setting of the D terminal employed in such a video signal apparatus is explained by referring to FIG. 19. FIG. 19 is a diagram showing a typical display screen of a display apparatus connected to the D terminal employed in the video signal apparatus.

In the typical display screen shown in FIG. 19, it is assumed that a video signal having the 750p signal format is supplied to the digital video apparatus. If the output format setting of the D terminal is the D3 terminal setting, a video signal having the 1125i signal format is output to the display screen 201 of the display apparatus. Assume that the user changes the output format setting of the D terminal from the D3 terminal setting to the D4 terminal setting. In this case, since the signal format is changed from 1125i to 750p in accordance with the change in output format setting, a video signal having the 750p signal format is output to the background of a dialog window A as shown in a display screen 202, and the dialog window A shows a query warning asking: "The output signal format will be changed. Are you sure to change the format?" In addition, the dialog window A shows a button A1 functioning as a Yes button and a button A2 functioning as a No button.

If the display apparatus connected to the D terminal employed in the video signal apparatus is also compatible with a video signal having the 750p signal format, a video signal having the 750p signal format will appear normally on the display screen 202. Thus, in this case, the user will immediately know that the display apparatus is compatible with a video signal having the 750p signal format. Accordingly, the user will select the Yes button A1, typically via an input unit including buttons. As the user selects the Yes button A1, the output format setting of the D terminal is changed to the D4 terminal setting so that the user is capable of viewing a display screen 203 showing the video signal having the 750p signal format.

If the video signal apparatus is not compatible with a video signal having the 750p signal format, on the other hand, the display of the video signal having the 750p signal format on the display screen 202 will go wrong. Thus, the user will immediately know that the display apparatus is not compatible with a video signal having the 750p signal format. Accordingly, the user will select the No button A2, typically via the input unit including buttons to prevent the output format setting of the D terminal from being changed to the D4 terminal setting so that the user will be capable of viewing a display screen 204 showing the video signal having the 1125i signal format with the output format setting of the D terminal remaining at the D3 terminal setting.

As described above, in the digital video apparatus, when the user changes the output format setting of the D terminal, a video signal corresponding to the new output format setting is output to the background of a dialog window showing a query asking the user a question as to whether the output format setting is indeed to be changed. Then, on the basis of a command entered by the user, the digital video apparatus determines whether the output format setting is to be changed.

If a video signal having the 1125i signal format, for example, is supplied to the digital video apparatus having a D terminal with such specifications, however, the video signal is output in a signal format remaining unchanged from 1125i even if the output format setting of the D terminal is changed from the D3 terminal setting to the D4 terminal setting. Thus, even if the output format setting of the D terminal is changed to the D4 terminal setting, the display apparatus connected to the digital video apparatus is capable of normally displaying the video signal having the 1125i signal format, for example.

In such a case, with the output format setting of the D terminal changed to the D4 terminal setting, it is not until the arrival of an input video signal having the 750p signal format at the digital video apparatus that the output signal format of the video signal will be changed to 750p in accordance with the new format of the input video signal. In consequence, the video screen appearing in the display apparatus connected to the digital video apparatus will suddenly go wrong. Thus, in some cases, the user grasps the fact that the display apparatus is not compatible with the 750p signal format (or not completely compatible with the D4 terminal).

That is to say, immediately after the user changes the output format setting of the D terminal, in some cases, the user may not recognize that the display apparatus is not compatible with the 750p signal format.

In addition, in some cases, after the user has changed the output format setting of the D terminal, an input video signal having the 750p signal format may not be supplied for a while. In such cases, the user will not know the reason the video screen appearing in the display apparatus connected to the digital video apparatus has suddenly gone wrong when a video signal having the 750p signal format is supplied to the digital video apparatus. In some cases, the user may be confused, thinking that the display apparatus is out of order. To solve these problems, the following method is introduced.

Figure 20:
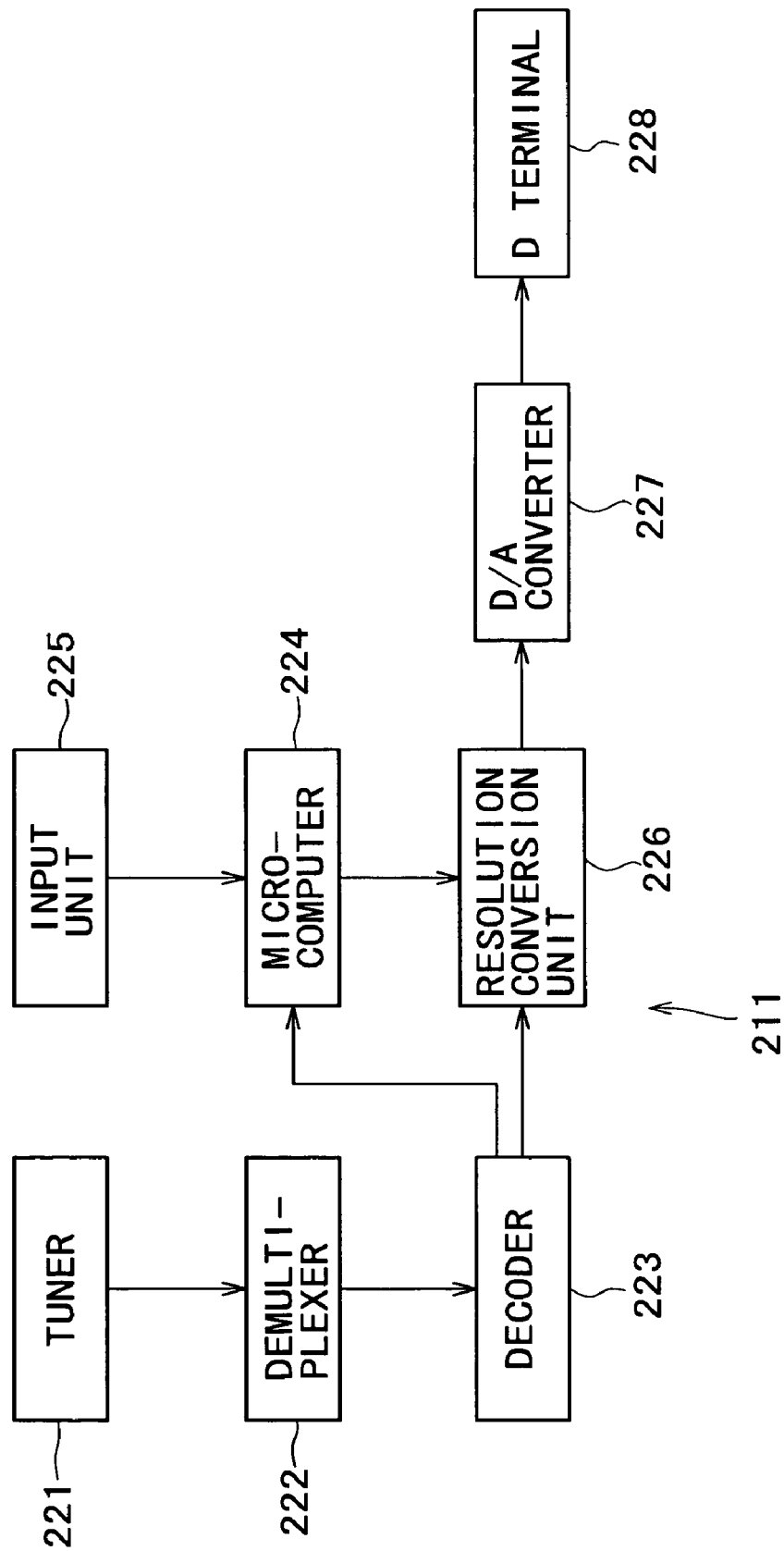
FIG. 20 is a block diagram showing another typical configuration of the digital video apparatus.

FIG. 20 is a block diagram showing another typical configuration of the digital video apparatus adopting a method for solving these problems. In the typical configuration shown in FIG. 20, as an example, a digital video apparatus functioning as a set top box (STB) is explained. However, the digital video apparatus can function not only as a set top box, but also as a satellite tuner, a DVD (Digital Versatile Disk) apparatus or a Blu-ray disk recorder. The digital video apparatus 211 is connected, via the D terminal 228, to a display apparatus not shown in the figure.

A tuner 221 selects a broadcast signal received by an antenna not shown in the figure, demodulates the selected signal and outputs the demodulated signal to a demultiplexer 222. The demultiplexer 222 splits the broadcast signal into video and audio signals, supplying the video signal to a decoder 223. The video signal is a video signal completing an MPEG (Moving Picture Experts Group) compression process. It is to be noted that the audio signal is supplied to an audio decoder unit to be processed.

The decoder 223 decodes the video signal into a signal in a base band in accordance with the signal format of the video signal and outputs the result of decoding to a resolution conversion unit 226. In addition, the decoder 223 supplies information on the signal format of the video signal to a microcomputer 224. It is to be noted that the signal format of the broadcast signal is roughly classified into four defined signal formats, i.e., the 525i, 525p, 1125i and 750p signal formats. The number in each of the signal formats is the number of scanning lines, notation i denotes an interlace (interlaced scanning) method and notation p denotes progressive (sequential scanning) method.

The microcomputer 224 controls other components in accordance with input signals received from an input unit 225 as input signals corresponding to operations carried out by the user. In addition, the microcomputer 224 controls the resolution conversion unit 226 on the basis of information received from the decoder 223 on the signal format of each video signal and the output format setting specified by the user as the output format setting of the D terminal 228.

The input unit 225 includes a variety of switches and buttons as well as a remote controller. The input unit 225 outputs the input signals cited above in accordance with operations carried out by the user. When a predetermined button is pressed to change the output format setting of the D terminal 228, for example, the output format setting of the D terminal 228 is supplied to the microcomputer 224.

In accordance with a control signal received from the microcomputer 224, the resolution conversion unit 226 carries out color and resolution conversion processes on the video signal received from the decoder 223 and supplies a result of the processes to a D/A (Digital/Analog) conversion unit 227.

The D/A conversion unit 227 converts the video signal received from the resolution conversion unit 226 into an analog signal and outputs the analog signal to a display apparatus by way of the D terminal 228. The D terminal 228 includes a D1 terminal for a video signal with a 525i signal format, a D2 terminal for a video signal with a 525i or 525p signal format, a D3 terminal for a video signal with a 525i, 525p or 1125i signal format and a D4 terminal for a video signal with a 525i, 525p, 1125i or 750p signal format. On the basis of the input signal format (that is, the signal format of an input video signal) and the setting of the D terminal 228 employed in the digital video apparatus 211, specifications of the output signal format (that is, the signal format of the output video signal) are determined in advance as explained earlier by referring to FIG. 16.

Thus, the microcomputer 224 controls the resolution conversion unit 226 on the basis of the output format setting shown in FIG. 16 as the output format setting of the D terminal 228.

Figure 21:
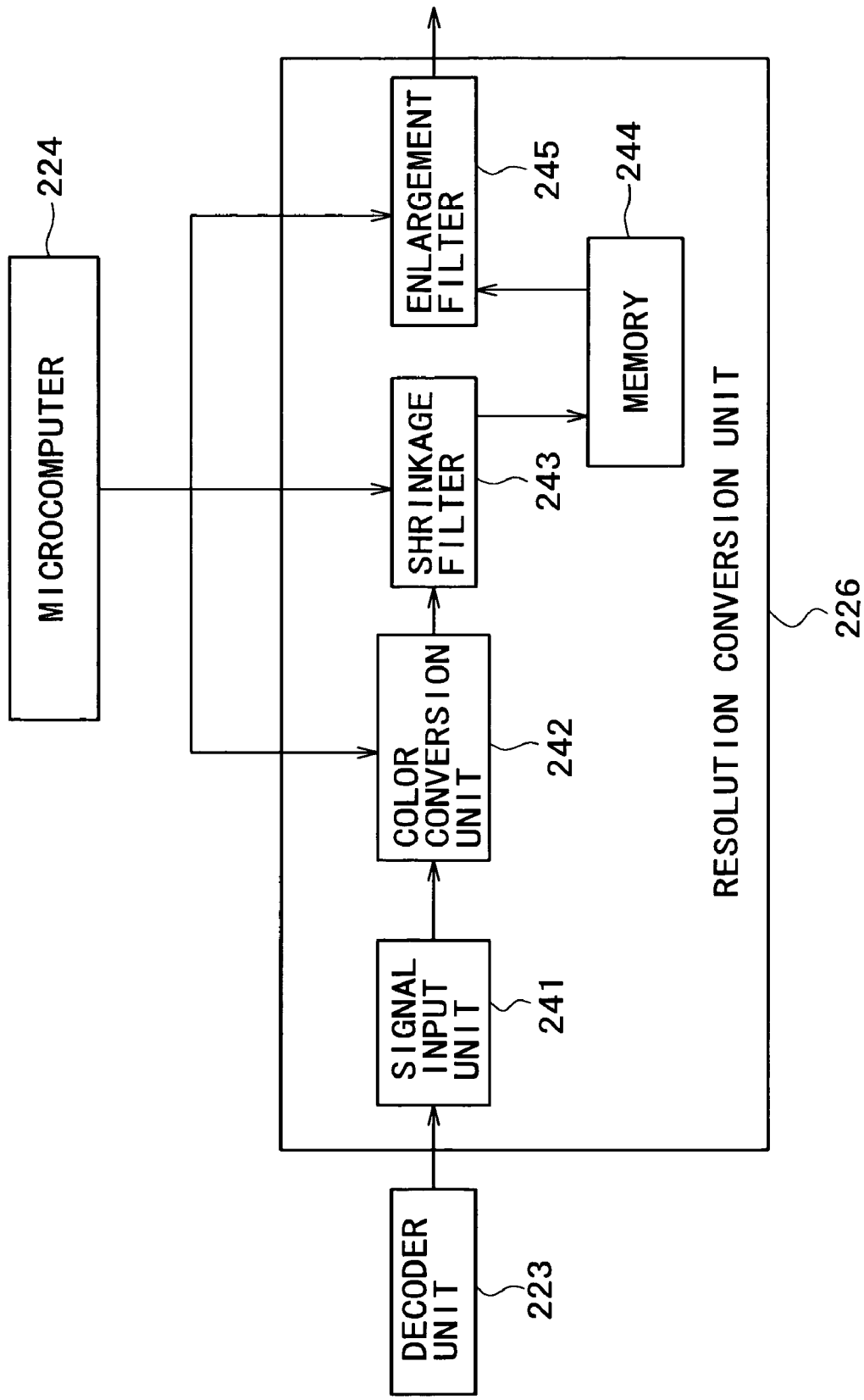
FIG. 21 is a block diagram showing a typical configuration of a resolution conversion unit employed in the digital video apparatus shown in FIG. 20.

FIG. 21 is a block diagram showing the details of a typical configuration of the resolution conversion unit 226. As shown in FIG. 21, the resolution conversion unit 226 includes a signal input unit 241, a color conversion unit 242, a shrinkage filter 243, a memory 244 and an enlargement filter 245.

The signal input unit 241 supplies a video signal received from the decoder 223 to the color conversion unit 242. In accordance with a control signal received from the microcomputer 224, the color conversion unit 242 carries out a color conversion process when the input signal format of the video signal is different from the output signal format of the video signal. It is to be noted that the color conversion process carried out by the color conversion unit 242 has a configuration basically identical with that of the color conversion process explained earlier by referring to FIG. 13, and its explanation is therefore not repeated to avoid duplication.

In accordance with a control signal received from the microcomputer 224, the shrinkage filter 243 shrinks the video signal when a resolution conversion process is carried out to convert a high resolution into a low resolution and writes the shrunk video signal into the memory 244. On the other hand, the shrinkage filter 243 keeps the video signal unchanged when a resolution conversion process is carried out to convert a low resolution into a high resolution and writes the unchanged video signal into the memory 244. In accordance with a control signal received from the microcomputer 224, the enlargement filter 245 enlarges a video signal read out from the memory 244 and outputs the enlarged video signal to the D/A conversion unit 227 when a resolution conversion process is carried out to convert a low resolution into a high resolution. On the other hand, the enlargement filter 245 keeps a video signal read out from the memory 244 unchanged and outputs the unchanged video signal to the D/A conversion unit 227 when a resolution conversion process is carried out to convert a high resolution into a low resolution. It is to be noted that the resolution conversion process carried out by the shrinkage filter 243, the memory 244 and the enlargement filter 245 has a configuration basically identical with that of the resolution conversion process explained earlier by referring to FIG. 7, and its explanation is therefore not repeated to avoid duplication.

Figure 22:
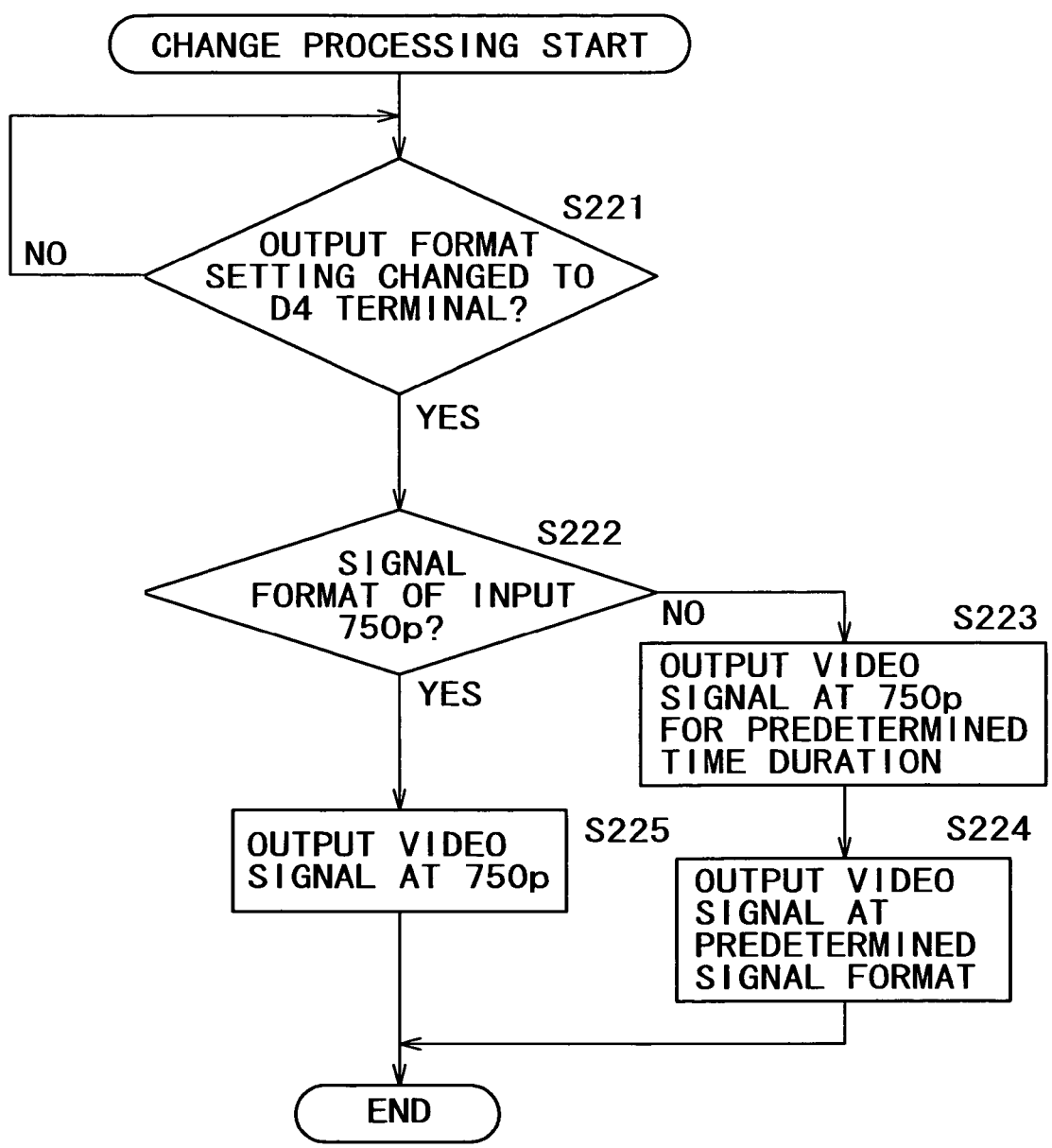
FIG. 22 shows a flowchart referred to in explaining a process to change the output setting of the digital video apparatus shown in FIG. 20.

By referring to the flowchart shown in FIG. 22, the following description explains a process to change the output format setting of the D terminal 228 employed in the digital video apparatus 211.

Assume, for example, that the output format setting of the D terminal 228 employed in the digital video apparatus 211 has been set as a D3 terminal and the user changes the output format setting of the D terminal 228 to the D4 terminal setting by operating a button employed in the input unit 225. In this case, at step S221, the microcomputer 224 determines whether the output format setting specified by the user as the output format setting of the D terminal 228 has been changed to the D4 terminal setting on the basis of a signal received from the input unit 225. This step is executed repeatedly in a state of waiting for the result of the determination to indicate that the output format setting of the D terminal 228 has been changed to the D4 terminal setting.

As the determination result obtained at step S221 indicates that the output format setting of the D terminal 228 has been changed to the D4 terminal setting, the flow of the process goes on to step S222. At S222, the microcomputer 224 determines whether the input signal format of the video signal is 750p on the basis of information received from the decoder 223 on the input signal format of the video signal. The 750p signal format is a signal format having the highest resolution among the signal formats provided for the D4 terminal. In addition, the 750p signal format is a signal format with a resolution which cannot be output by the D3 terminal prior to the change. (That is why, in the case of the D3 terminal, the 750p signal format is output after a resolution conversion process of converting the signal format into 1125i.)

If the input signal format of the video signal is determined at step S222 not to be 750p (that is, if the input signal format of the video signal is determined to be 525i, 525p or 1125i, for example), the flow of the process goes on to step S223. At step S223, the microcomputer 224 controls the shrinkage filter 243, the memory 244 and the enlargement filter 245 to carry out a resolution conversion process of converting the signal format into 750p and outputs the video signal to the D/A conversion unit 227 for a predetermined time duration (such as 5 seconds, or a period ending with an operation carried out by the user to select the Yes button A1 or the No button A2 appearing on the dialog window shown in FIG. 19). Thus, if the display apparatus is not compatible with the 750p signal format, a video display on the display apparatus will go wrong, making the user immediately aware of the fact that the display apparatus is not compatible with the 750p signal format (that is, the fact that the display apparatus is not completely compatible with the D4 terminal).

Then, at step S224, the microcomputer 224 controls the shrinkage filter 243, the memory 244 and the enlargement filter 245 to carry out a resolution conversion process of converting the output signal format of the video signal into a predetermined signal format (the 1125i signal format in the case of this example), and outputs the video signal to the D/A conversion unit 227.

More particularly, as explained earlier by referring to FIG. 7, assume, for example, that a video signal having the 1125i signal format is received. In this case, the shrinkage filter 243 extracts an effective picture area and writes the area into the memory 244 unchanged for 5 seconds. Then, the enlargement filter 245 enlarges the effective picture area stored in the memory 244 to the 750p signal format, places the area at a predetermined position in the video signal having the 750p signal format and outputs the video signal to the D/A conversion unit 227. The shrinkage filter 243 cuts out the effective picture area 5 seconds later and writes the area into the memory 244 without change. Then, the enlargement filter 245 places the effective picture area stored in the memory 244 unchanged at a predetermined position in the video signal having the 1125i signal format, and outputs the video signal to the D/A conversion unit 227.

If the input signal format of the video signal is determined at step S222 to be 750p, on the other hand, the flow of the process goes on to step S225. At step S225, the microcomputer 224 controls the shrinkage filter 243, the memory 244 and the enlargement filter 245 to output the video signal to the D/A conversion unit 227 with its output signal format kept at 750p.

As is obvious from the above description, when the output format setting of the D terminal 228 is changed (to the D4 terminal setting), the input video signal of any signal format is output once in the 750p signal format which is a signal format that cannot be output by the D3 terminal (or a signal format that can only be output by the D4 terminal). Thus, right after the output format setting of the D terminal 228 is changed, it is possible to determine whether the display apparatus is compatible with the 750p signal format (D4 terminal).

In the above description, the specifications shown in FIG. 16 as the specifications of the output signal format of the D terminal are assumed. However, the digital video apparatus 211 may also use the specifications explained earlier by referring to FIG. 1 as the specifications of the output signal format of the conventional D terminal.

Figure 23:
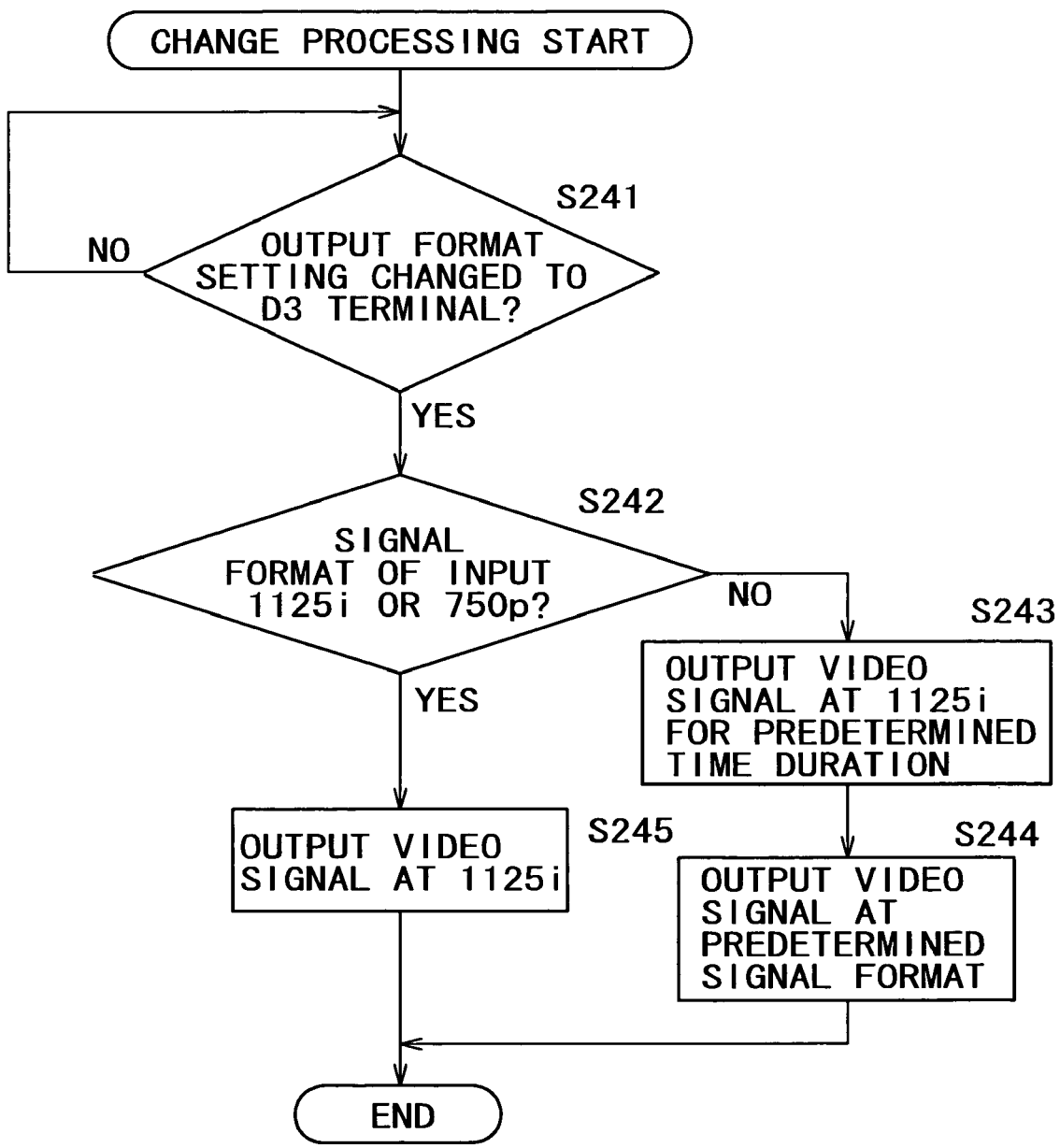
FIG. 23 shows a flowchart referred to in explaining another process to change the output setting of the digital video apparatus shown in FIG. 20.

By referring to the flowchart shown in FIG. 23, the following description explains another typical process carried out on the basis of the output signal format specifications shown in FIG. 1 as the output signal format specifications of the D terminal 28, to change the output format setting of the D terminal 228 employed in the digital video apparatus 211.

Assume, for example, that the output format setting of the D terminal 228 employed in the digital video apparatus 211 has been set as a D2 terminal. The user changes the output format setting of the D terminal 228, typically by operating a button employed in the input unit 225. In this case, at step S241, the microcomputer 224 determines whether the output format setting specified by the user as the output format setting of the D terminal 228 has been changed to the D3 terminal setting on the basis of a signal received from the input unit 225.

As the determination result obtained at step S241 indicates that the output format setting of the D terminal 228 has been changed to the D3 terminal setting, the flow of the process goes on to step S242. At step S242, the microcomputer 224 determines whether the input signal format of the video signal is 1125i or 750p on the basis of information received from the decoder 223 on the input signal format of the video signal.

The 1125i signal format is a signal format having the highest resolution provided for the D3 terminal. In addition, the 1125i signal format is a signal format with a resolution which cannot be output by the D2 terminal prior to the change. (The 525p signal format is output after a resolution conversion process.) The 750p signal format is a signal format with a resolution which cannot be output by the D3 terminal. That is why, in the case of the D3 terminal, the 750p signal format is output after a resolution conversion process of converting the signal format into 1125i (signal format with a resolution which cannot be output by the D2 terminal prior to the change) as described earlier.

If the input signal format of the video signal is determined at step S242 to be neither 1125i nor 750p (that is, the input signal format of the video signal is 525i or 525p, for example), the flow of the process goes on to step S243. At step S243, the microcomputer 224 controls the shrinkage filter 243, the memory 244 and the enlargement filter 245 to carry out a resolution conversion process of converting the signal format into 1125i and outputs the video signal to the D/A conversion unit 227 for a predetermined time duration (such as 5 seconds). Thus, if the display apparatus is not compatible with the 1125i signal format, a video display on the display apparatus will go wrong. This makes the user immediately aware of the fact that the display apparatus is not compatible with the 1125i signal format. (That is, the display apparatus is not completely compatible with the D3 terminal.)

Then, at step S244, the microcomputer 224 controls the shrinkage filter 243, the memory 244 and the enlargement filter 245 to carry out a resolution conversion process of converting the output signal format of the video signal into a predetermined signal format on the basis of the output format setting shown in FIG. 1 as the output format setting of the D terminal 228, and outputs the video signal to the D/A conversion unit 227. Thus, if the signal format of the input video signal is 525i, the video signal is output with the signal format remaining at 525i. By the same token, if the signal format of the input video signal is 525p, the video signal is output with the signal format remaining at 525p.

If the input signal format of the video signal is determined at step S242 to be 1125i or 750p, on the other hand, the flow of the process goes on to step S245. At step S245, the microcomputer 224 controls the shrinkage filter 243, the memory 244 and the enlargement filter 245 to output the video signal to the D/A conversion unit 227 with its output signal format converted into 1125i (or kept at 1125i).

As is obvious from the above description, when the output format setting of the D terminal 228 is changed (to the D3 terminal setting), the input video signal of any signal format is once output in the 1125i signal format. The 1125i signal format is a signal format that cannot be output by the D2 terminal (or a signal format that can be output only by the setting for the D3 terminal). Thus, right after the output format setting of the D terminal 228 is changed, it is possible to determine whether the display apparatus is compatible with the 1125i signal format (D3 terminal).

While the above description explains a change of the output format setting from the D2 terminal to the D3 terminal, the same effect can be obtained for a change of the output format setting from the D2 terminal to the D4 terminal or a terminal change from the D3 terminal to the D4 terminal. It is to be noted that, in the case of a change of the output format setting from the D2 or D3 terminal to the D4 terminal, an input video signal of any signal format is output in the 750p signal format that cannot be output by the D2 or D3 terminal (or a signal format that can be output only by the setting for the D4 terminal).

In addition, the above description also holds true for a change of the output format setting from the D1 terminal to any one of the D2 to D4 terminals.

As described above, when the output format setting of the D terminal 228 is changed, the video signal can be output in a signal format of the post-change output format setting without regard to the input signal format of the video signal. Since the video signal is output in an output signal format with a resolution that cannot be output with the pre-change output format setting, however, it is possible to determine whether the display apparatus is compatible with the post-change output format setting right after the output format setting is changed.

In accordance with the above description, the user can be prevented from mistakenly setting an output format setting with which the display apparatus is not completely compatible. Thus, the user can be prevented from being unaware of the reason the video display has suddenly gone wrong on the display apparatus and from incorrectly understanding that the video display has gone wrong because the display apparatus is out of order.

That is to say, the output format setting of the video output terminal can be prevented from being set incorrectly as described above. In addition, right after the output format setting of the video output terminal is changed, it is possible to determine whether the display apparatus is compatible with the post-change output format setting.

The series of processes described above can be carried out by hardware and/or execution of software. In either case, the digital video apparatus 1 shown in FIG. 2 and the digital video apparatus 211 shown in FIG. 20 typically can be implemented by a digital video apparatus 101 having a configuration like the one shown in FIG. 24.

In the configuration shown in FIG. 24, a CPU (Central Processing Unit) 111 carries out various kinds of processing by execution of programs stored in a ROM (Read Only Memory) 112 and programs loaded from a storage unit 118 into a RAM (Random Access Memory) 113. The RAM 113 is also used for properly storing data required by the CPU 111 in carrying out the various kinds of processing.

The CPU 111, the ROM 112 and the RAM 113 are connected to each other by a bus 114. The bus 114 is also connected to an input/output interface 115.

The input/output interface 115 is connected to an input unit 116, an output unit 117, the storage unit 118 and a communication unit 119. The input unit 116 includes a keyboard and a mouse. The output unit 117 includes a display unit, such as a CRT (Cathode Ray Tube) or an LCD (Liquid Crystal Display), and a speaker. The storage unit 118 typically includes a hard disk. The communication unit 119 includes a modem and a terminal adaptor. The communication unit 119 is a component for carrying out communication processing through a network not shown in the figure.

If necessary, the input/output interface 115 is also connected to a drive 120 on which a recording medium is mounted. The recording medium can be a magnetic disk 121, an optical disk 122, a magneto-optical disk 123 or a semiconductor memory 124. If needed, a computer program is read out from the recording medium to be installed into the storage unit 118.

If the series of processes described above is carried out by execution of software, programs composing the software can be installed into a computer embedded in dedicated hardware or a general-purpose personal computer or the like from a network or the recording medium described above. By installing a variety of programs into the general-purpose personal computer, the personal computer is capable of carrying out a variety of functions.

As shown in FIG. 24, the recording medium for recording the programs is packaged media distributed separately from the main body of the digital video apparatus as means for providing the user with the programs. Examples of the packaged media are the magnetic disk 121 including a flexible disk, the optical disk 122 including a CD-ROM (Compact Disk-Read Only Memory) and a DVD (Digital Versatile Disk), the magneto-optical disk 123 including an MD (Mini Disk, trademark) and the semiconductor memory 124. The recording medium can also be provided to the user as a medium embedded in advance in the main body of the digital video apparatus. Examples of the embedded recording medium are the ROM 112 for recording the programs and a hard disk included in the storage unit 118 as a recording medium for storing the programs.

It is to be noted that, in this specification, steps describing a program recorded in the recording medium may naturally include processes that can be carried out in the order the steps are described along the time axis. However, the steps do not have to be carried out sequentially along the time axis. That is to say, the steps may also include processes that can be carried out concurrently or individually.

As described above, in accordance with the present invention, it is possible to display a video signal at a high picture quality by effectively making use of the resolution of the video signal processing apparatus. In addition, in accordance with the present invention, the synchronization of the digital video apparatus can be prevented from going wrong due to a change of a signal format. On top of that, in accordance with the present invention, the picture quality can be prevented from deteriorating.

The invention claimed is:

1. A video signal processing apparatus for processing a video signal and outputting the processed video signal, said video signal processing apparatus comprising:
a video output terminal having a plurality of output settings each for outputting a video signal with at least one of a plurality of resolutions;
a selection unit operable to select a desired one of the plurality of output settings;
a detection unit operable to detect which of the plurality of output settings has been selected; and
an output control unit operable to control output of the processed video signal in an output signal format with a highest one of the plurality of resolutions that can be output with the detected output setting without regard to an input signal format of the video signal received at the apparatus, wherein the input signal format has a resolution corresponding to one of the plurality of resolutions.

2. The video signal processing apparatus according to claim 1, wherein, if the detection unit detects that a D4 setting has been selected as the output setting, the output signal format with the highest one of the plurality of resolutions is a 750p signal format.

3. The video signal processing apparatus according to claim 1, wherein, if the detection unit detects that a D3 setting has been selected as the output setting, the output signal format with the highest one of the plurality of resolutions is an 1125i signal format.

4. The video signal processing apparatus according to claim 1, wherein, if the detection unit detects that a D2 setting has been selected as the output setting, the output signal format with the highest one of the plurality of resolutions is a 525p signal format.

5. The video signal processing apparatus according to claim 1, wherein, if the detection unit detects that a D1 setting has been selected as the output setting, the output signal format with the highest one of the plurality of resolutions is a 525i signal format.

6. The video signal processing apparatus according to claim 1, further comprising:
a comparison/determination unit operable to compare a resolution of the input signal format of the video signal with a resolution of the output signal format of the processed video signal, wherein, if the comparison/determination unit determines that the resolution of the output signal format is higher than the resolution of the input signal format of the video signal, the output control unit carries out an enlargement conversion process to increase the resolution of the video signal and, if the comparison/determination unit determines that the resolution of the output signal format is lower than the resolution of the input signal format of the video signal, the output control unit carries out a shrinkage conversion process to decrease the resolution of the video signal.

7. A video signal processing method for processing a received video signal and outputting the processed video signal by way of a video output terminal having a plurality of output settings each for outputting a video signal with at least one of a plurality of resolutions, said video signal processing method comprising:
selecting a desired one of the plurality of output settings;
detecting which of the plurality of output settings has been selected; and
controlling output of the processed video signal in an output signal format with a highest one of the plurality of resolutions that can be output with the detected output setting without regard to an input signal format of the video signal, wherein the input signal format has a resolution corresponding to one of the plurality of resolutions.

8. The video signal processing method according to claim 7, wherein, if the detected output setting is a D4 setting, the output signal format with the highest one of the plurality of resolutions is a 750p signal format.

9. The video signal processing method according to claim 7, wherein, if the detected output setting is a D3 setting, the output signal format with the highest one of the plurality of resolutions is an 1125i signal format.

10. The video signal processing method according to claim 7, wherein, if the detected output setting is a D2 setting, the output signal format with the highest one of the plurality of resolutions is a 525p signal format.

11. The video signal processing method according to claim 7, wherein, if the detected output setting is a D1 setting, the output signal format with the highest one of the plurality of resolutions is a 525i signal format.

12. The video signal processing method according to claim 7, further comprising:
comparing a resolution of the input signal format of the video signal with a resolution of the output signal format of the processed video signal, wherein, if it is determined that the resolution of the output signal format is higher than the resolution of the input signal format of the video signal, the controlling step carries out an enlargement conversion process to increase the resolution of the video signal and, if it is determined that the resolution of the output signal format is lower than the resolution of the input signal format of the video signal, the controlling step carries out a shrinkage conversion process to decrease the resolution of the video signal.

13. A video signal processing apparatus for processing a video signal and outputting the processed video signal, said video signal processing apparatus comprising:
a video output terminal having a plurality of output settings each for outputting a video signal with at least one of a plurality of resolutions;
a selection unit operable to select a desired one of the plurality of output settings;
a detection unit operable to detect which of the plurality of output settings has been selected; and
an output control unit operable to control output of the processed video signal in an output signal format with a highest one of the plurality of resolutions that can be output without regard to an input signal format of the video signal if the detection unit detects that a first one of the plurality of output settings has been selected, and to control output of the processed video signal in an output signal format with either the highest one of the plurality of resolutions or with a second highest one of the plurality of resolutions depending on the input signal format of the video signal if the detection unit detects that a second one of the plurality of output settings has been selected.

14. The video signal processing apparatus according to claim 13, wherein the output control unit is operable to control output of the processed video signal in a 750p signal format if the detection unit detects that the second output setting has been selected and the input signal format of the video signal is 750p, and to control output of the processed video signal in an 1125i signal format if the detection unit detects that the second output setting has been selected and the input signal format of the video signal is different from the 1125i signal format.

15. The video signal processing apparatus according to claim 13, wherein the output control unit is operable to control output of the processed video signal in a 750p signal format if the detection unit detects that the second output setting has been selected and the input signal format of the video signal is a signal format of a progressive format, and to control output of the processed video signal in an 1125i signal format if the detection unit detects that the second output setting has been selected and the input signal format of the video signal is a signal format of an interlace format.

16. The video signal processing apparatus according to claim 13, further comprising:
a comparison/determination unit operable to compare a resolution of the input signal format of the video signal with a resolution of the output signal format of the processed video signal, wherein, if the comparison/determination unit determines that the resolution of the output signal format is higher than the resolution of the input signal format of the video signal, the output control unit carries out an enlargement conversion process to increase the resolution of the video signal and, if the comparison/determination unit determines that the resolution of the output signal format is lower than the resolution of the input signal format of the video signal, the output control unit carries out a shrinkage conversion process to decrease the resolution of the video signal.

17. A video signal processing method for processing a video signal and outputting the processed video signal by way of a video output terminal having a plurality of output settings each for outputting a video signal with at least one of a plurality of resolutions, said video signal processing method comprising:
selecting a desired one of the plurality of output settings;
detecting which of the plurality of output settings has been selected; and
controlling output of the processed video signal in an output signal format with a highest one of the plurality of resolutions that can be output without regard to an input signal format of the video signal if the detection step detects that a first one of the plurality of output settings has been selected, and controlling output of the processed video signal in an output signal format with either the highest one of the plurality of resolutions or with a second highest one of the plurality of resolutions depending on the input signal format of the video signal if the detection step detects that a second one of the plurality of output settings has been selected.

18. The video signal processing method according to claim 17, wherein the controlling step controls output of the processed video signal in a 750p signal format if the detecting step detects that the second output setting has been selected and the input signal format of the video signal is 750p, and controls output of the processed video signal in an 1125i signal format if the detecting step detects that the second output setting has been selected and the input signal format of the video signal is different from the 1125i signal format.

19. The video signal processing method according to claim 17, wherein the controlling step controls output of the processed video signal in a 750p signal format if the detecting step detects that the second output setting has been selected and the input signal format of the video signal is a signal format of a progressive format, and controls output of the processed video signal in an 1125i signal format if the detecting step detects that the second output setting has been selected and the input signal format of the video signal-is a signal format of an interlace format.

20. The video signal processing method according to claim 17, further comprising:
comparing a resolution of the input signal format of the video signal with a resolution of the output signal format of the processed video signal, wherein, if it is determined that the resolution of the output signal format is higher than the resolution of the input signal format of the video signal, the controlling step carries out an enlargement conversion process to increase the resolution of the video signal and, if it is determined that the resolution of the output signal format is lower than the resolution of the input signal format of the video signal, the controlling step carries out a shrinkage conversion process to decrease the resolution of the video signal.

21. The video signal processing apparatus according to claim 1, further comprising:
a switching unit operable to switch the video output terminal from a present output setting to the selected output setting;
a switching determination unit operable to determine whether the switching unit has switched the video output terminal from a first output setting to a second output setting, the first output setting having an output signal format with a first resolution and the second output setting having an output signal format with a resolution which is higher than the first resolution and which cannot be output by the first output setting; and an input determination unit operable to determine whether the input signal format of the video signal has a resolution which cannot be output by the first output setting if the switching determination unit determines that the video output terminal has been switched from the first output setting to the second output setting, wherein, if the input determination unit determines that the input signal format of the video signal does not have a resolution which cannot be output by the first output setting, the output control unit is operable to output the processed video signal for a predetermined period of time in an output signal format having a resolution which is higher than the first resolution and which cannot be output by the first output setting and to then output the processed video signal in an output signal format corresponding to the input signal format of the video signal.

22. The video signal processing method according to claim 7, further comprising:

switching the video output terminal from a present output setting to the selected output setting;

determining whether the video output terminal has been switched from a first output setting to a second output setting, the first output setting having an output signal format with a first resolution and the second output setting having an output signal format with a resolution which is higher than the first resolution and which cannot be output by the first output setting; and determining whether the input signal format of the video signal has a resolution which cannot be output by the first output setting if it is determined that the video output terminal has been switched from the first output setting to the second output setting, wherein, if it is determined that the input signal format of the video signal does not have a resolution which cannot be output by the first output setting, the controlling step includes outputting the processed video signal for a predetermined time in an output signal format having a resolution which is higher than the first resolution and which cannot be output by the first output setting and then outputting the processed video signal in an output signal format corresponding to the input signal format of the video signal.

23. The video signal processing apparatus according to claim 13, further comprising:

a switching unit operable to switch the video output terminal from a present output setting to the selected output setting;

a switching determination unit operable to determine whether the switching unit has switched the video output terminal from a first output setting to a second output setting, the first output setting having an output signal format with a first resolution and the second output setting having an output signal format with a resolution which is higher than the first resolution and which cannot be output by the first output setting; and an input determination unit operable to determine whether the input signal format of the video signal has a resolution which cannot be output by the first output setting if the switching determination unit determines that the video output terminal has been switched from the first output setting to the second output setting, wherein, if the input determination unit determines that the input signal format of the video signal does not have a resolution which cannot be output by the first output setting, the output control unit is operable to output the processed video signal for a predetermined period of time in an output signal format having a resolution which is higher than the first resolution and which cannot be output by the first output setting and to then output the processed video signal in an output signal format corresponding to the input signal format of the video signal.

24. The video signal processing method according to claim 17, further comprising:

switching the video output terminal from a present output setting to the selected output setting;

determining whether the video output terminal has been switched from a first output setting to a second output setting, the first output setting having an output signal format with a first resolution and the second output setting having an output signal format with a resolution which is higher than the first resolution and which cannot be output by the first output setting; and determining whether the input signal format of the video signal has a resolution which cannot be output by the first output setting if it is determined that the video output terminal has been switched from the first output setting to the second output setting, wherein, if it is determined that the input signal format of the video signal does not have a resolution which cannot be output by the first output setting, the controlling step includes outputting the processed video signal for a predetermined time in an output signal format having a resolution which is higher than the first resolution and which cannot be output by the first output setting and then outputting the processed video signal in an output signal format corresponding to the input signal format of the video signal.

* * * * *